United States Patent
Poddar et al.

(10) Patent No.: US 10,460,189 B2
(45) Date of Patent: *Oct. 29, 2019

(54) METHOD AND APPARATUS FOR DETERMINING SUMMATION OF PIXEL CHARACTERISTICS FOR RECTANGULAR REGION OF DIGITAL IMAGE AVOIDING NON-ALIGNED LOADS USING MULTIPLE COPIES OF INPUT DATA

(71) Applicant: Texas Instruments Incorporated, Dallas, TX (US)

(72) Inventors: Deepak Kumar Poddar, Bangalore (IN); Pramod Kumar Swami, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,930

(22) Filed: Feb. 12, 2019

(65) Prior Publication Data

US 2019/0171894 A1  Jun. 6, 2019

Related U.S. Application Data

(63) Continuation of application No. 15/393,566, filed on Dec. 29, 2016, now Pat. No. 10,248,876.

(30) Foreign Application Priority Data

Jun. 27, 2016 (IN) .............................. 201641022034

(51) Int. Cl.
  *G06K 9/00* (2006.01)
  *G06K 9/46* (2006.01)
(52) U.S. Cl.
  CPC ....... *G06K 9/00986* (2013.01); *G06K 9/4614* (2013.01); *G06K 9/4642* (2013.01)

(58) Field of Classification Search
  USPC ........................................................ 382/195
  See application file for complete search history.

(56) References Cited

U.S. PATENT DOCUMENTS

| 7,099,510 B2 | 7/2006 | Jones |
| 7,274,832 B2 | 9/2007 | Nicponski |
| (Continued) | | |

OTHER PUBLICATIONS

R. Lienhart and J. Maydt, "An Extended Set of Haar-like Features for Rapid Object Detection," Proceedings. International Conference on Image Processing, 2002, pp. I-900-I-903 vol. 1.

(Continued)

*Primary Examiner* — Xuemei G Chen
(74) *Attorney, Agent, or Firm* — Brian D. Graham; Charles A. Brill; Frank S. Cimino

(57) ABSTRACT

A method of determining a summation of pixel characteristics for a rectangular region of a digital image includes determining if a base address for a data element in an integral image buffer is aligned for an SIMD operation by a processor embedded in an electronic assembly configured to perform Haar-like feature calculations. The data element represents a corner of the rectangular region of an integral image. The integral image is a representation of the digital image. The integral image is formed by data elements stored in the integral image buffer. The data element is loaded from the integral image buffer to the processor when the base address is aligned for the SIMD operation. An offset data element of an offset integral image is loaded from an offset integral buffer when the base address is non-aligned for the SIMD operation. The offset data element represents the corner of the rectangular region.

20 Claims, 14 Drawing Sheets

(56) References Cited

U.S. PATENT DOCUMENTS

| | | |
|---|---|---|
| 7,903,870 B1 | 3/2011 | Budagavi |
| 8,165,401 B2 | 4/2012 | Funayama |
| 8,781,234 B2 | 7/2014 | Zhang |
| 8,805,081 B2 | 8/2014 | Chotard |
| 9,036,937 B2 | 5/2015 | Tsai |
| 9,092,695 B1 | 7/2015 | Ogale |
| 9,135,521 B2 | 9/2015 | Lim |
| 9,237,350 B2 | 1/2016 | Cheong |
| 9,251,569 B2 | 2/2016 | Hsieh |
| 9,398,297 B2 | 7/2016 | Gupta |
| 9,442,723 B2 | 9/2016 | Yang |
| 9,589,175 B1 | 3/2017 | Arnold |
| 9,715,717 B2 | 7/2017 | Liou |
| 9,898,681 B2 | 2/2018 | Lee |
| 2011/0211233 A1 | 9/2011 | Yokono |
| 2012/0134586 A1 | 5/2012 | Pajaniradja |
| 2012/0328160 A1 | 12/2012 | Sa |
| 2013/0163861 A1 | 6/2013 | Mariatos |
| 2014/0023232 A1 | 1/2014 | Kim |
| 2016/0042246 A1 | 2/2016 | Herrmann |
| 2016/0125263 A1* | 5/2016 | Sankaranarayanan .... G06T 7/60 382/195 |
| 2017/0038405 A1 | 2/2017 | Zhou |
| 2017/0213099 A1 | 7/2017 | Matsui |

OTHER PUBLICATIONS

J. Whitehill and C. W. Omlin, "Haar Features for FACS AU Recognition," 7th International Conference on Automatic Face and Gesture Recognition (FGR06), Southampton, 2006, pp. 5 pp. -101.

Yoav Freund and Robert E. Schapire, "A Short Introduction to Boosting," Journal of Japanese Society for Artificial Intelligence, vol. 14, No. 5 (1999), pp. 771-780.

Paul Viola and Michael Jones, "Robust Real-time Object Detection," Second International Workshop on Statistical and Computational Theories of Vision—Modeling, Learning Computing, and Sampling, Jul. 13, 2001, pp. 1-25.

Franklin C. Crow, "Summed-Area Tables for Texture Mapping," ACM SIGGRAPH Computer Graphics, vol. 18 Issue 3, Jul. 1984, pp. 207-212.

Kisacanin B., "Integral Image Optimizations for Embedded Vision Applications," IEEE Southwest Symposium on Image Analysis and Interpretation (SSIAI), pp. 181-184, Mar. 2008.

Ehsan S., et al., "Integral Images: Efficient Algorithms for Their Computation and Storage in Resource-Constrained Embedded Vision Systems", Sensors 2015, 15, 16804-16830.

\* cited by examiner

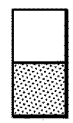
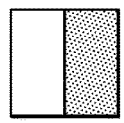
FIG. 1A    FIG. 1B
FIG. 2A    FIG. 2B
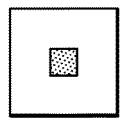
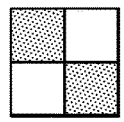
FIG. 3A    FIG. 3B
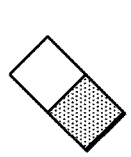
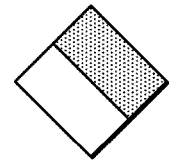
FIG. 4A    FIG. 4B
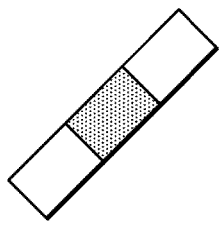
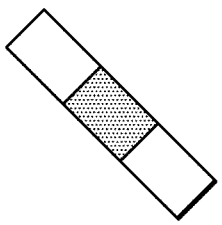
FIG. 5A    FIG. 5B
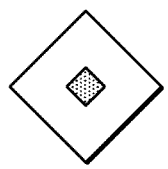
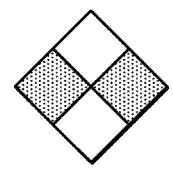
FIG. 6A    FIG. 6B

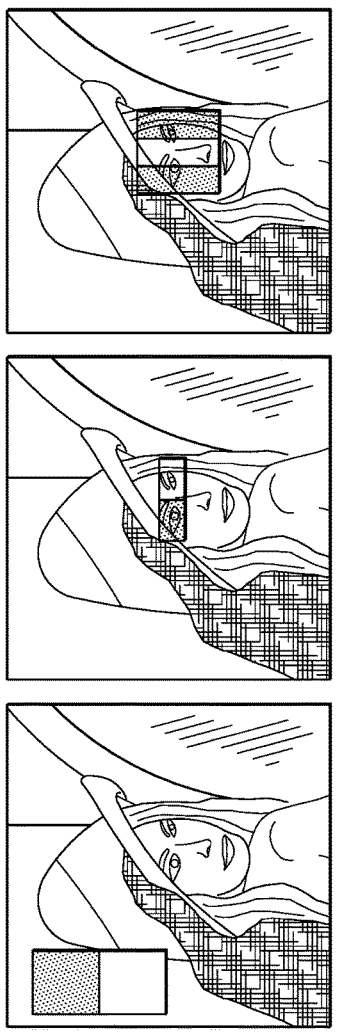
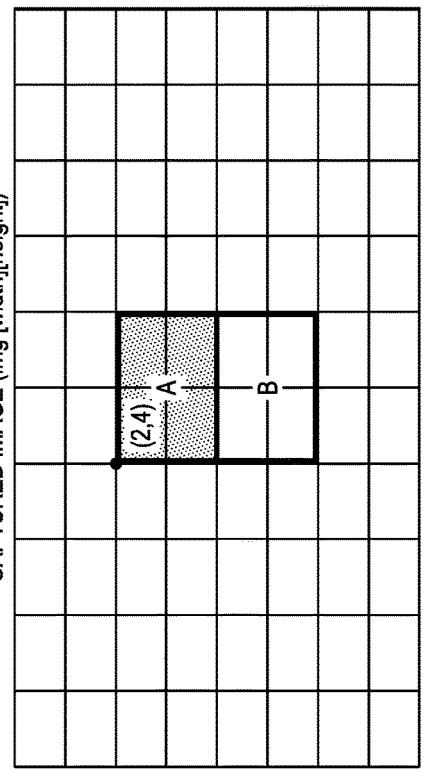
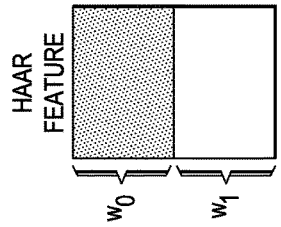
FIG. 14
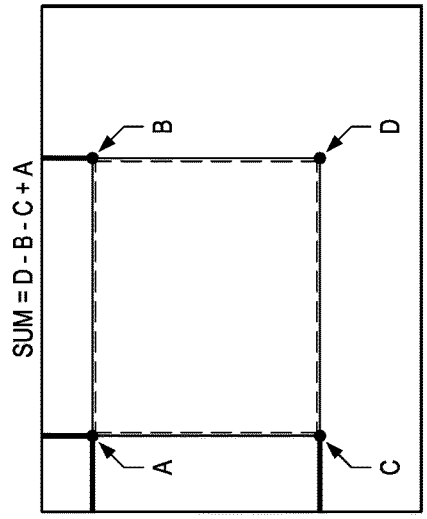
FIG. 15

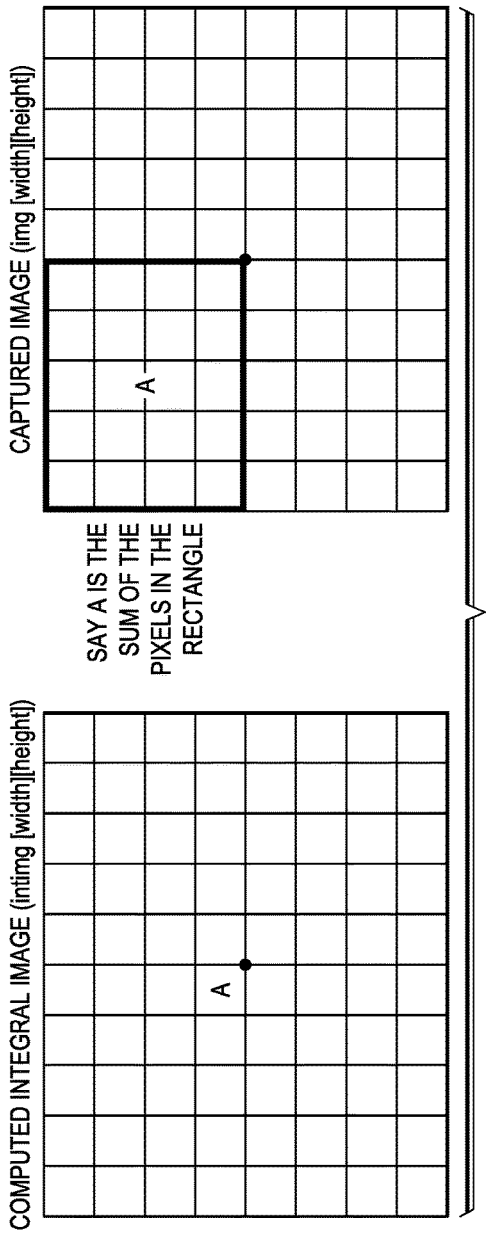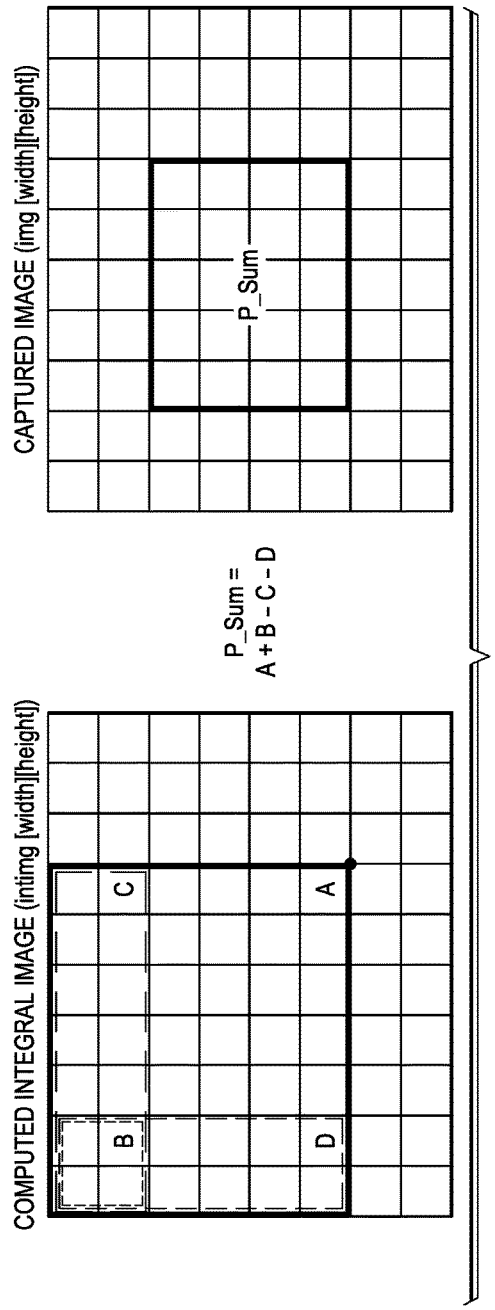

METHOD AND APPARATUS FOR DETERMINING SUMMATION OF PIXEL CHARACTERISTICS FOR RECTANGULAR REGION OF DIGITAL IMAGE AVOIDING NON-ALIGNED LOADS USING MULTIPLE COPIES OF INPUT DATA

This application is a continuation of U.S. patent application Ser. No. 15/393,566, filed Dec. 29, 2016, currently pending, which is incorporated by reference herein in its entirety, and claims priority to and the benefit of Indian Provisional Patent Application Serial No. 201641022034, filed Jun. 27, 2016 and entitled CYCLE OPTIMAL DENSE HAAR LIKE FEATURE CALCULATION FOR EMBEDDED PROCESSORS, the entirety of which is incorporated herein by reference.

TECHNICAL FIELD

This disclosure relates generally to Haar-like feature calculations, especially dense Haar-like feature calculations, associated with object detection for advanced driver assistance system (ADAS) applications. More specifically, this disclosure relates to an aspect of Haar-like feature calculations that implements a processor-based method for determining a summation of pixel characteristics for a rectangular region of a digital image. In particular, the disclosed method permits multiple words in the rectangular region of an integral image to be loaded into the processor in an aligned manner even if the base storage location for the multiple words is not aligned for single instruction multiple data (SIMD) operations by the processor. It is understood that the processor-based method for determining the summation of pixel characteristics for the rectangular region can be used for other purposes beyond those described herein regarding Haar-like feature calculations and ADAS applications. For example, the method can be used for weighted summation, where weight can be constant for rectangular window or it can vary within the rectangle based on the pixel location inside the rectangle. Where there is only one rectangle is there in processing and weights are decided based on pixel location in the rectangle then the process becomes image level 2D convolution. Thus, this technique can also be used in 2D image convolution.

BACKGROUND

Haar-like features along with AdaBoost (i.e., adaptive boosting) techniques are popular methods for object detection and classification in computer vision applications. For example, these techniques can be used in pedestrian detection, traffic sign recognition or any other kinds of object detection in ADAS applications. Haar-like features are calculated at a particular location of a digital image using weighted sum of image pixels for rectangular regions of the image. Weights are applied to the summed pixels for the particular regions of the Haar-like feature based on learned aspects from object detection and classification for similar features and similar images. Weights and feature are learned from training (e.g., AdaBoost training). FIGS. 1A-B show examples of Haar-like edge features. FIGS. 2A-B show examples of Haar-like line features. FIGS. 3A-B show examples of Haar-like center-surround features. The sum of the pixels under the dark area is weighted and compared to a weighted sum of the pixels under the lighter area. The resultant value is the feature cost at a reference for the area subject to the calculation.

Dense Haar-like feature calculations require the feature to be calculated at each pixel location in an image or areas of interest within the image by sliding the Haar-like feature by one pixel in raster order through the area. Typically, raster order refers to a left-to-right sequence along each row of the image or area and sequentially moving down from an uppermost row to a lowest row of the image or area.

A popular method to calculate pixel characteristics under a rectangular region is to calculate an integral image representation of the raw image and utilize pixel summations in the integral image instead of pixels of the raw image. Each element of an integral image may be 32 bit (one word) for normal use of application. In general, the performance and efficiency of Haar-like feature calculations are heavily influenced by processor data loads. For example, a Haar-like feature calculation may require data loads from non-aligned locations of a buffer storing the integral image because Haar feature size can be any suitable number of pixels (e.g., odd or even pixel dimensions). Align or non-align words are associated with an alignment boundary. In the current context, the alignment boundary is 64 bits (i.e., two words). Anything that is not at the boundary of 64 bits is not aligned.

A problem is that the data loads required in a Haar-like feature calculation may not utilize the maximum capability of the processor (e.g., C6000 Digital Signal Processor (DSP)), where non-aligned data reads are costlier than aligned data reads. This problem is amplified for dense Haar feature calculations that are performed on each pixel location of the image. This problem also exists when rotated Haar-like features are calculated.

FIGS. 4A-B show examples of rotated Haar-like edge features. FIGS. 5A-B show examples of rotated Haar-like line features. FIGS. 6A-B show examples of rotated Haar-like center-surround features. Rotated Haar-like features can be treated as an unrotated feature (target region) on a rotated image or as a rotated feature (target region) on an unrotated image. In either arrangement, the summation of the pixels must use a raster sequence based on the orientation of the target rectangular region.

SUMMARY

In one aspect, a method of determining a summation of pixel characteristics for a rectangular region of a digital image is provided. In one embodiment, the method includes: determining if a first base address for a first data element in an integral image buffer is aligned for a first single instruction multiple data (SIMD) operation by a processor embedded in an electronic assembly configured to perform Haar-like feature calculations, wherein the first data element represents a first corner of a pre-selected rectangular region of an integral image, wherein the integral image is a representation of a pre-selected digital image, wherein the integral image is formed by data elements stored in the integral image buffer on a storage device accessible to the processor; loading the first data element from the integral image buffer to the processor when the first base address is aligned for the first SIMD operation; and loading an offset first data element of an offset integral image from an offset integral buffer on the storage device to the processor when the first base address is non-aligned for the first SIMD operation, wherein the offset first data element represents the first corner of the pre-selected rectangular region; wherein the offset data elements of the offset integral image are defined by the corresponding data elements of the integral image and stored at address locations in the offset integral buffer that are offset right or left by one address location such that a select data element in the integral image buffer at a select address that is non-aligned for a select SIMD operation by the processor is located at a select offset address in the offset integral buffer that is aligned for the select SIMD operation.

In another embodiment, the method of determining a summation of pixel characteristics for a rectangular region of a digital image includes: determining if first, second, third, and fourth base addresses for respective first, second, third, and fourth data elements in an integral image buffer are aligned for respective first, second, third, and fourth SIMD operations by a processor embedded in an electronic assembly configured to perform Haar-like feature calculations, wherein the first, second, third, and fourth data elements respectively represent upper left, upper right, lower left, and lower right corners of a pre-selected rectangular region of an integral image, wherein the integral image is a representation of a pre-selected digital image, wherein the integral image is formed by data elements stored in the integral image buffer on a storage device accessible to the processor; loading the first, second, third, and fourth data elements from the integral image buffer to the processor when the respective first, second, third, and fourth base address is aligned for the respective first, second, third, and fourth SIMD operation; and loading offset first, offset second, offset third, and offset fourth data elements of an offset integral image from an offset integral buffer on the storage device to the processor when the respective first, second, third, and fourth base address is non-aligned for the respective first, second, third, and fourth SIMD operation, wherein the offset first, offset second, offset third, and offset fourth data elements respectively represent the upper left, upper right, lower left, and lower right corners of the pre-selected rectangular region; wherein the offset data elements of the offset integral image are defined by the corresponding data elements of the integral image and stored at address locations in the offset integral buffer that are offset right or left by one address location such that a select data element in the integral image buffer at a select address that is non-aligned for a select SIMD operation by the processor is located at a select offset address in the offset integral buffer that is aligned for the select SIMD operation.

In another aspect, a non-transitory computer-readable medium is provided. The non-transitory computer-readable medium storing program instructions that, when executed by a processor embedded in a processor-controlled electronic assembly configured to perform Haar-like feature calculations, cause the processor-controlled electronic assembly to perform a method of determining a summation of pixel characteristics for a rectangular region of a digital image. In one embodiment, the method includes: determining if first, second, third, and fourth base addresses for respective first, second, third, and fourth data elements in an integral image buffer are aligned for respective first, second, third, and fourth SIMD operations by a processor embedded in an electronic assembly configured to perform Haar-like feature calculations, wherein the first, second, third, and fourth data elements respectively represent upper left, upper right, lower left, and lower right corners of a pre-selected rectangular region of an integral image, wherein the integral image is a representation of a pre-selected digital image, wherein the integral image is formed by data elements stored in the integral image buffer on a storage device accessible to the processor; loading the first, second, third, and fourth data elements from the integral image buffer to the processor when the respective first, second, third, and fourth base address is aligned for the respective first, second, third, and fourth SIMD operation; and loading offset first, offset second, offset third, and offset fourth data elements of an offset integral image from an offset integral buffer on the storage device to the processor when the respective first, second, third, and fourth base address is non-aligned for the respective first, second, third, and fourth SIMD operation, wherein the offset first, offset second, offset third, and offset fourth data elements respectively represent the upper left, upper right, lower left, and lower right corners of the pre-selected rectangular region; wherein the offset data elements of the offset integral image are defined by the corresponding data elements of the integral image and stored at address locations in the offset integral buffer that are offset right or left by one word address location such that a select data element in the integral image buffer at a select address that is non-aligned for a select SIMD operation by the processor is located at a select offset address in the offset integral buffer that is aligned for the select SIMD operation, the method further comprising: calculating a summation of pixel characteristics for the pre-selected rectangular region using a regional area algorithm accessible to the processor by subtracting the corresponding data elements for the upper right corner and the lower left corner from a sum of the corresponding data elements for the upper left corner and the lower right corner.

BRIEF DESCRIPTION OF THE DRAWINGS

In the drawings, like reference numerals refer to like elements throughout, and the various features are not necessarily drawn to scale.

FIGS. 1A-B provide exemplary arrangements of rectangular regions within an integral image for Haar-like feature calculations to facilitate detection of edges;

FIGS. 2A-B provide exemplary arrangements of rectangular regions within an integral image for Haar-like feature calculations to facilitate detection of lines;

FIGS. 3A-3B provide exemplary arrangements of rectangular regions within an integral image for Haar-like feature calculations to facilitate detection of center-surround characteristics;

FIGS. 4A-B provide exemplary rotated arrangements of rectangular regions within an integral image for Haar-like feature calculations to facilitate detection of edges;

FIGS. 5A-B provide exemplary rotated arrangements of rectangular regions within an integral image for Haar-like feature calculations to facilitate detection of lines;

FIGS. 6A-B provide exemplary rotated arrangements of rectangular regions within an integral image for Haar-like feature calculations to facilitate detection of center-surround characteristics;

FIG. 14 provides a functional diagram of an exemplary embodiment of a Haar-like feature-based object detection system;

FIG. 15 provides a functional diagram of an exemplary embodiment of a process for determining a summation of pixel characteristics for a rectangular region of a digital image;

FIG. 19 provides a functional diagram of an exemplary captured digital image and a corresponding exemplary computed integral image;

FIG. 20 provides a functional diagram of still yet another exemplary embodiment of a process for determining a summation of pixel characteristics for a rectangular region of a digital image;

DETAILED DESCRIPTION

This disclosure describes various embodiments of a process, electronic assembly, and system for determining a summation of pixel characteristics for a rectangular region of a digital image. The various embodiments can be implemented to perform Haar-like feature calculations, including dense Haar-like feature calculations. The Haar-like feature calculations can be used in conjunction with detection of objects of interest within the digital image. The objects of interest may include edges, lines, and center-surround objects. Various combinations of Haar-like feature calculations can be used to detect faces, pedestrians, traffic signs, and other objects of interest.

Figure 7A:
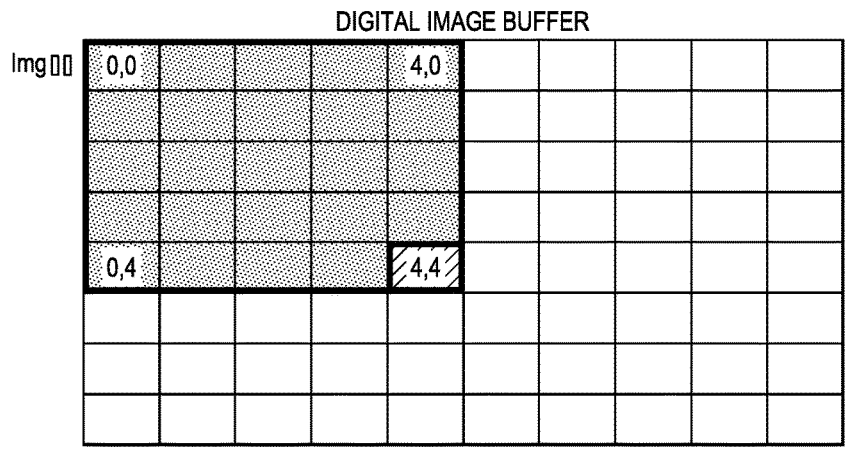
FIGS. 7A-B provide a representation of an exemplary digital image in an exemplary digital image buffer and a corresponding representation of an exemplary integral image in an exemplary integral image buffer.
Figure 7B:
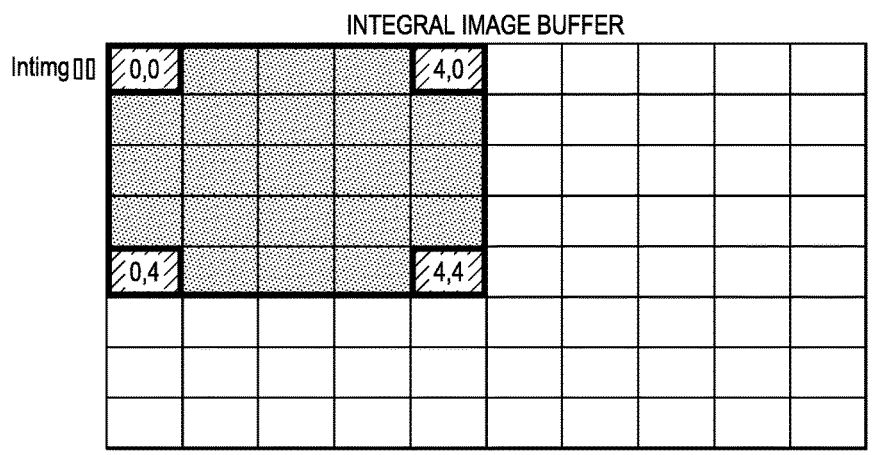

With reference to FIGS. 7A-B, an exemplary digital image is stored in the exemplary digital image buffer (Img [ ][ ]) of FIG. 7A and can be used to generate an exemplary integral image stored in the exemplary integral image buffer (Intimg [ ][ ]) of FIG. 7B. Generally, the value for each data element (I,j) of the Intimg [ ][ ] is defined as a sum of the pixels (or pixel characteristics) situated in an upper left region of the Img [ ][ ] defined by the pixel (I,j) in the Img[ ][ ] that corresponds to the same position as the data element (I,j) in the Intimg [ ][ ]. For example, the value for data element (4,4) of Intimg [ ][ ] in FIG. 7B is a sum of pixel characteristic values for the pixels in the shaded rectangular area in the Img [ ][ ] of FIG. 7A. As shown, the shaded area in FIG. 7A defines the pixels that are above and to the left of pixel (4,4). The pixel sum of a rectangle within an integral image can be found using an existing integral image algorithm. For additional information on integral image algorithms see Viola et al., Robust Real-time Object Detection, International Journal of Computer Vision, $2^{nd}$ International Workshop on Statistical and Computational Theories of Vision—Modeling, Learning, Computing, and Sampling, Vancouver, Canada, Jul. 13, 2001, 25 pp.

For example, the value for the data elements in Intimg [ ][ ] of FIG. 7B that correspond to the 5×5 shaded rectangular area of FIGS. 7A-B are determined as follows:
Data element value (DEV) (0,0)=pixel characteristic value (PCV) (0,0);
DEV (0,1)=DEV (0,0)+PCV (0,1);
DEV (0,2)=DEV (0,1)+PCV (0,2);
DEV (0,3)=DEV (0,2)+PCV (0,3);
DEV (0,4)=DEV (0,3)+PCV (0,4);
DEV (1,0)=DEV (0,0)+PCV (1,0);
DEV (1,1)=DEV (1,0)+PCV (0,1)+PCV (1,1);
DEV (1,2)=DEV (1,1)+PCV (0,2)+PCV (1,2);
DEV (1,3)=DEV (1,2)+PCV (0,3)+PCV (1,3);
DEV (1,4)=DEV (1,3)+PCV (0,4)+PCV (1,4);
DEV (2,0)=DEV (1,0)+PCV (2,0);
DEV (2,1)=DEV (2,0)+PCV (0,1)+PCV (1,1)+PCV (2,1);
DEV (2,2)=DEV (2,1)+PCV (0,2)+PCV (1,2)+PCV (2,2);
DEV (2,3)=DEV (2,2)+PCV (0,3)+PCV (1,3)+PCV (2,3);
DEV (2,4)=DEV (2,3)+PCV (0,4)+PCV (1,4)+PCV (2,4);
DEV (3,0)=DEV (2,0)+PCV (3,0);
DEV (3,1)=DEV (3,0)+PCV (0,1)+PCV (1,1)+PCV (2,1)+PCV (3,1);
DEV (3,2)=DEV (3,1)+PCV (0,2)+PCV (1,2)+PCV (2,2)+PCV (3,2);
DEV (3,3)=DEV (3,2)+PCV (0,3)+PCV (1,3)+PCV (2,3)+PCV (3,3);
DEV (3,4)=DEV (3,3)+PCV (0,4)+PCV (1,4)+PCV (2,4)+PCV (3,4);
DEV (4,0)=DEV (3,0)+PCV (4,0);
DEV (4,1)=DEV (4,0)+PCV (0,1)+PCV (1,1)+PCV (2,1)+PCV (3,1)+PCV (4,1);
DEV (4,2)=DEV (4,1)+PCV (0,2)+PCV (1,2)+PCV (2,2)+PCV (3,2)+PCV (4,2);
DEV (4,3)=DEV (4,2)+PCV (0,3)+PCV (1,3)+PCV (2,3)+PCV (3,3)+PCV (4,3); and
DEV (4,4)=DEV (4,3)+PCV (0,4)+PCV (1,4)+PCV (2,4)+PCV (3,4)+PCV (4,4).

Using the integral image to calculate a feature value for a shaded rectangular region, a value for the 5×5 shaded rectangular area of the Intimg [ ][ ] of FIG. 7B can be determined based on a rectangular area algorithm the calculates the feature value based on the pixels sums in the Intimg [ ][ ] for the four corners of the rectangle. The four corners of the shaded rectangular area (i.e., (0,0), (4,0), 0,4), and (4,4)) are highlighted in FIG. 7B. Once the values for the data elements of Intimg [ ][ ] are determined, the sum of the pixel characteristics for the shaded rectangular area of Img [ ][ ] are calculated using the following rectangular area algorithm:

Summed Rectangular Region (SRR)=DEV(0,0)+
DEV(4,4)−DEV(0,4)−DEV(4,0).

As shown in the rectangular area algorithm, only four data element values must be read when the feature value is calculated using the integral image of FIG. 7B. In contrast, if the feature value is calculated using the digital image of FIG. 7A, each pixel characteristic value from the 5×5 rectangular region in the digital image of FIG. 7A must be read (i.e., 25 pixel characteristic value reads). For example, the pixel characteristics value for each pixel in the digital image may be represented by 8 bits, the data element values in the integral image may be represented by 32 bits, and the image processing block's size (i.e., quantity of pixels to be summed) may be chosen such that the largest value for any data element in the integral image does not overflow the 32 bit capacity of the data elements.

Figure 8:
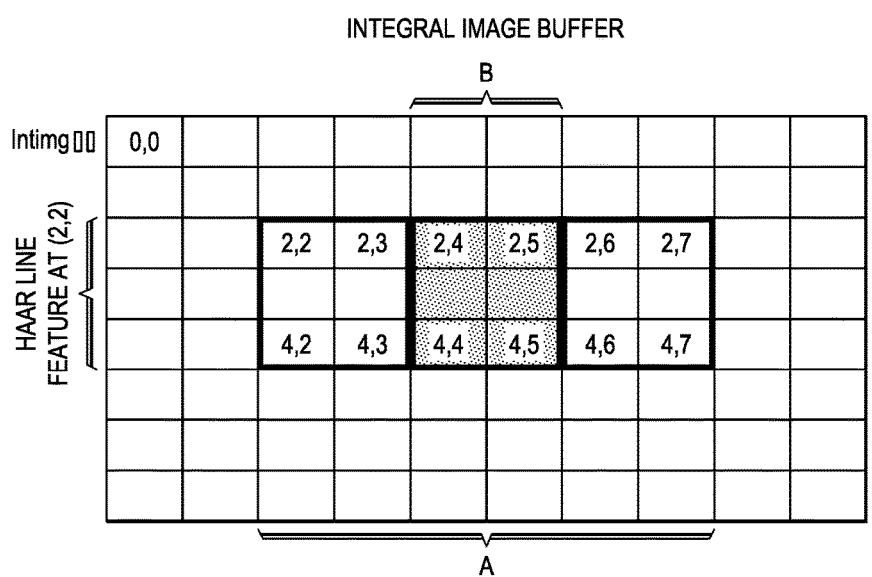
FIG. 8 provides a functional diagram of an exemplary Haar-like line feature calculation using an exemplary integral image buffer.

With reference to FIG. 8, a Haar-like line feature at data element (2,2) of an integral image can be calculated using the following algorithm:

Feature Value(FV)=w0*((DEV(2,2)+DEV(4,7))−
(DEV(2,7)−DEV(4,2)))+w1*((DEV(2,4)+DEV
(4,5))−(DEV(2,5)−DEV(4,4))).

It is noted that the exemplary Haar-like line feature calculation above requires eight reads of DEVs from the integral image to determine the sum of pixel characteristics for two rectangular regions (A, B) and applies predetermined weights (w0, w1) to the two summed rectangular regions. The four corners of the first rectangular region (A) are represented by data elements (2,2), (2,7), (4,2), and (4,7). The four corners of the second rectangular region (B) are represented by data elements (2,4), (2,5), (4,4), and (4,5). For example, the first weight (w0) can be selected to emphasize darker pixel characteristics where the feature to be detected is expected to be darker. Similarly, the second weight (w1) can be selected to emphasize lighter pixel characteristics where the feature to be detected is expected to be lighter.

With reference again to FIGS. 1A-B, 2A-B, 3A-B, 4A-B, 5A-B, and 6A-B, the upright and rotated Haar-like features have minimum requirements for data element reads from an integral image. For example, the Haar-like edge features of FIGS. 1A-B and 4A-B require a minimum of six data element reads assuming there are two rectangles in the feature. Haar-like line features of FIGS. 2A-B and 5A-B require a minimum of eight data element reads assuming there are two rectangles in the feature. Haar-like center-surround features of FIGS. 3A and 6A require a minimum of eight data element reads assuming there are two rectangles in the feature. Haar-like center-surround features of FIGS. 3B and 6B require a minimum of nine data element reads assuming there are three rectangles in the feature.

A consideration in managing performance and efficiency of Haar-like feature calculations is the bottlenecking that may occur when loading data elements of an integral image into a processor. One of the goals of this disclosure is to exploit effective utilization of data load capabilities of processors. For example, the TMS320C66x Digital Signal Processor (DSP) by Texas Instruments uses a 32-bit data bus for word reads and 32-bit register pairs (i.e., 64 bits) to accommodate doubleword reads (i.e., two 32-bit word reads). For one word loads to the C66x DSP, the load operation is represented as one cycle (.D)+one cycle (.T), where .D and .T are functional units on the processor that is involved in data read operation. For doubleword loads to the C66x DSP, the load operation is represented as one cycle (.D)+one cycle (.T) if the base address for the doubleword is doubleword-aligned with the processor. However, for doubleword loads to the C66x DSP, the load operation is represented as one cycle (.D)+two cycles (.T) if the base address for the doubleword is not doubleword-aligned with the processor. Thus, the best capability of the C66x DSP is 0.25 cycle per word load for doubleword loads when the base address for the doublewords are doubleword-aligned with the processor.

A conventional method for Haar-like feature calculations can work on two locations at a time when the processor can load two words (e.g., doublewords) in a single instruction. For example, the Texas Instruments' C6000 series processors can work on two locations at a time because they can load two words in a single instruction (i.e., single instruction multiple data (SIMD) operations). For example, with reference again to FIG. 8, where the eight reads of DEVs from the integral image are doubleword reads, the data elements for a next feature value calculation can be read at the same time as the data elements for the initial feature value. Thus, the data elements for calculating the feature value at (2,2) and (2,3) can be read at the same time.

With reference again to FIG. 8, where the eight reads of DEVs from the integral image are doubleword reads (i.e., four feature location processing together), the data elements for a next feature value calculation can be read at the same time as the data elements for the initial feature value. Thus, the data elements for calculating the feature value at (2,2) and (2,3) can be read at the same time. The next feature value for (2,3) can be calculated using the same algorithm as feature value (2,2):

Next FV=w0*((DEV(2,3)+DEV(4,8))−(DEV(2,8)−
DEV(4,3)))+w1*((DEV(2,5)+DEV(4,6))−(DEV
(2,6)−DEV(4,5))).

For the next feature value, the two rectangular regions are shifted two data element to the right. The four corners of the next first rectangular region are data elements (2,4), (2,9), (4,4), and (4,9). The four corners of the next second rectangular region are data elements (2,6), (2,7), (4,6), and (4,7). For doubleword reads, all pointers jump by two in order to perform a next doubleword read operation for the next computation. The use of doubleword reads facilitates dense Haar-like feature calculations because two parallel computations are set up for consecutive Haar-like features.

The parallel Haar-like feature calculations for data elements (2,2) and (2,3) can be determined as follows:

FV(2,2)|Next FV(2,3)=(w0|w0)*(((Intimg(2,2)|Intimg
(2,3))+(Intimg(4,7)|Intimg(4,8)))−((Intimg(2,7)
|Intimg(2,8))−(Intimg(4,2)|Intimg(4,3))))+
(w1|w1)*((Intimg(2,4)|Intimg(2,5))+(Intimg(4,5)
|Intimg(4,6)))−((Intimg(2,5)|Intimg(2,6))−
(Intimg(4,4)|Intimg(4,5))).

Another way of presenting the doubleword reads and the feature value and next feature value computations is presented below in separate calculations:

FV(2,2)=w0*((Intimg(2,2)+Intimg(4,7))−(Intimg(2,
7)−Intimg(4,2)))+w1*((Intimg(2,4)+Intimg(4,
5))−(Intimg(2,5)−Intimg(4,4))); and Next FV(2,3)=w0*((Intimg(2,3)+Intimg(4,8))−(In-
timg(2,8)−Intimg(4,3))+w1*((Intimg(2,5))+In-
timg(4,6))−(Intimg(2,6)−Intimg(4,5)).

With continued reference to FIG. 8, where the eight reads of DEVs from the integral image are quadword reads, the data elements for the next feature value calculation, a further feature value calculation, and an even further feature value calculation can be read at the same time as the data elements for the initial feature value. Thus, the data elements for calculating the feature value at (2,2), (2,3), (2,4), and (2,5) can be read at the same time.

The further feature value for (2,4) can be calculated using the same algorithm as feature values (2,2) and (2,3):

Further FV=w0*((DEV(2,4)+DEV(4,9))−(DEV(2,9)−DEV(4,4)))+w1*((DEV(2,6)+DEV(4,7))−(DEV(2,7)−DEV(4,6))).

Likewise, the even further feature value for (2,5) can be calculated using the same algorithm as feature values (2,2), (2,3), and (2,4):

Even Further FV=w0*((DEV(2,5)+DEV(4,10))−(DEV(2,10)−DEV(4,5)))+w1*((DEV(2,7)+DEV(4,8))−(DEV(2,8)−DEV(4,7))).

For the further feature value, the two rectangular regions are shifted one data element to the right of the rectangular regions for the next feature value. The four corners of the further first rectangular region are data elements (2,4), (2,9), (4,4), and (4,9). The four corners of the further second rectangular region are data elements (2,6), (2,7), (4,6), and (4,7). For the even further feature value, the two rectangular regions are shifted one data element to the right of the rectangular regions for the further feature value. The four corners of the even further first rectangular region are data elements (2,5), (2,10), (4,5), and (4,10). The four corners of the even further second rectangular region are data elements (2,7), (2,8), (4,7), and (4,8). For quadword reads, all pointers jump by four in order to perform a next quadword read operation for the next computation. The use of quadword reads facilitates dense Haar-like feature calculations because four parallel computations are set up for consecutive Haar-like features.

For example, the integral image buffer can be arranged such that data elements with an even "X" coordinate can have an address that is aligned for multiple data word read operations by the processor and data elements with an odd "X" coordinate can be considered non-aligned. Thus, even if the integral image pitch is even and the base address for the initial data element is doubleword-aligned, it is possible that some of the doubleword reads are non-aligned. For example, vector Intimg (4,7)|Intimg (4,8); vector Intimg (2,7)|Intimg (2,8); vector Intimg (4,5)|Intimg (4,6); vector Intimg (2,5) |Intimg (2,6)) are non-aligned when data elements at odd "X" coordinates are non-aligned for the integral image buffer.

Two doubleword data can be loaded in a single cycle if a base address is doubleword-aligned. For Texas Instruments' C66X processor, this results in 0.25 cycles per word read. If the data is not doubleword-aligned, the C66X processor will take 0.5 cycles per word load. Use of the non-aligned integral image buffer exploits the more efficient data load capability of the C66x processor. When N pixels are worked together, to read N words (32 bit) in a single cycle. N will depend on how many words can be read in a single instruction for a specific processor. For the C66x processor, N=2. For the aligned offset, a pointer is selected from the doubleword-aligned integral image buffer. For the non-aligned offset, the pointer is selected from the word-aligned integral image buffer. This makes the load from the word-aligned integral image buffer also doubleword-aligned.

Figure 9A:
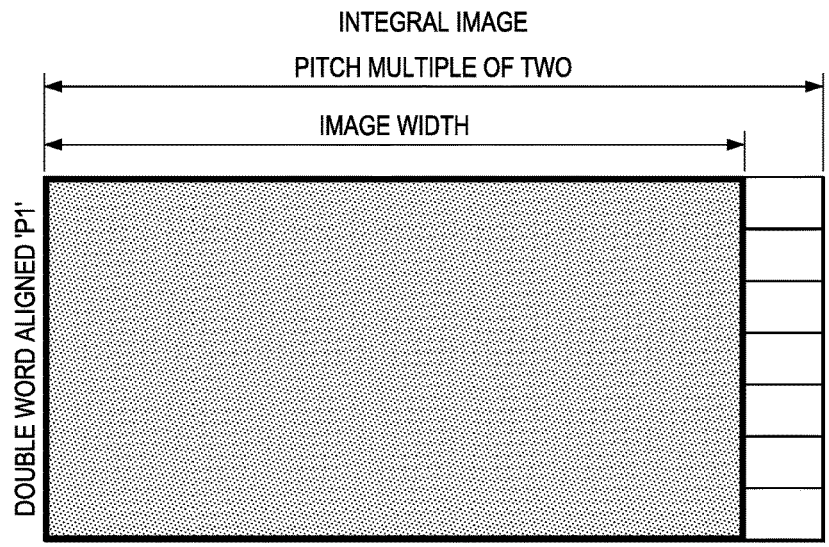
FIGS. 9A-B provide an exemplary doubleword aligned integral image buffer and an exemplary word aligned integral image buffer.
Figure 9B:
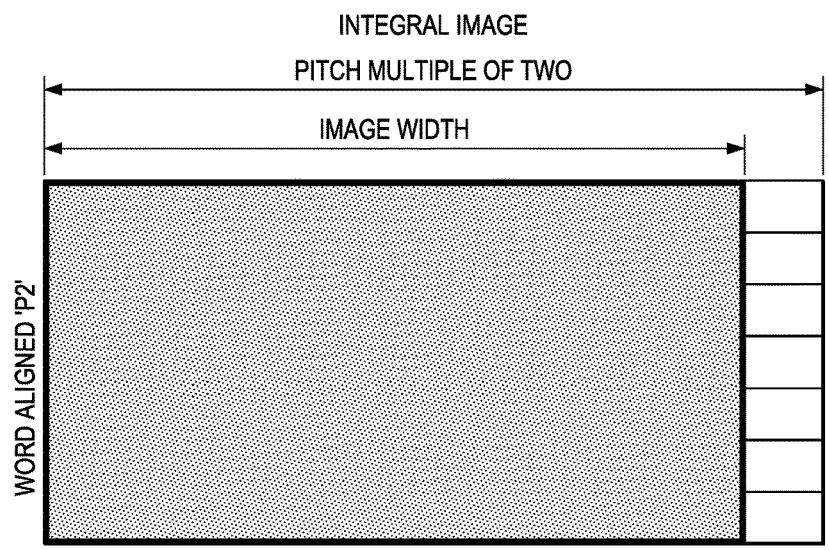

With reference to FIGS. 9A-B, an exemplary doubleword aligned integral image buffer and an exemplary word aligned integral image buffer have the same pitch (e.g., multiple of 2). The pitch of each buffer is kept such that, for each row, start data in the buffer is doubleword aligned (FIG. 9A) or word aligned (FIG. 9B). If the feature is rotated, then specific rotated-aligned and rotated non-aligned buffers are chosen for loading the data words. In FIG. 9A, each element in the integral image may be 32 bits and the integral image buffer is doubleword-aligned with a pitch multiple of two. In FIG. 9B, each 32-bit element is represented in an aliased integral image and the integral image buffer is word-aligned with a pitch multiple of two. The non-aligned (i.e., word-aligned) buffer is achieved by an enhanced direct memory access (EDMA) copy from the aligned buffer.

Figure 10:
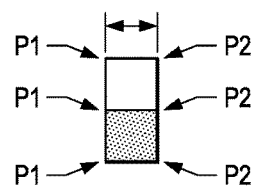
FIG. 10 provides a functional diagram of an exemplary Haar-like edge feature calculation using an exemplary integral image buffer.

With reference to FIG. 10, a Haar-like line feature calculation is performed for two rectangular areas that have a width defined by an odd number of data elements. The two rectangular areas are arranged vertically. In this exemplary calculation, TL is always picked from the doubleword-aligned buffer P1 for aligned offsets and TR is always picked from the word-aligned buffer P2 for non-aligned offsets.

The C6000 series processor can perform doubleword reads from address locations that are aligned for SIMD operations by the processor as well as from address locations that are non-aligned for SIMD operations. However, doubleword reads from address locations that are aligned for SIMD operations are more efficient (i.e., faster) than doubleword reads from address locations that are non-aligned for SIMD operations.

Figure 11A:
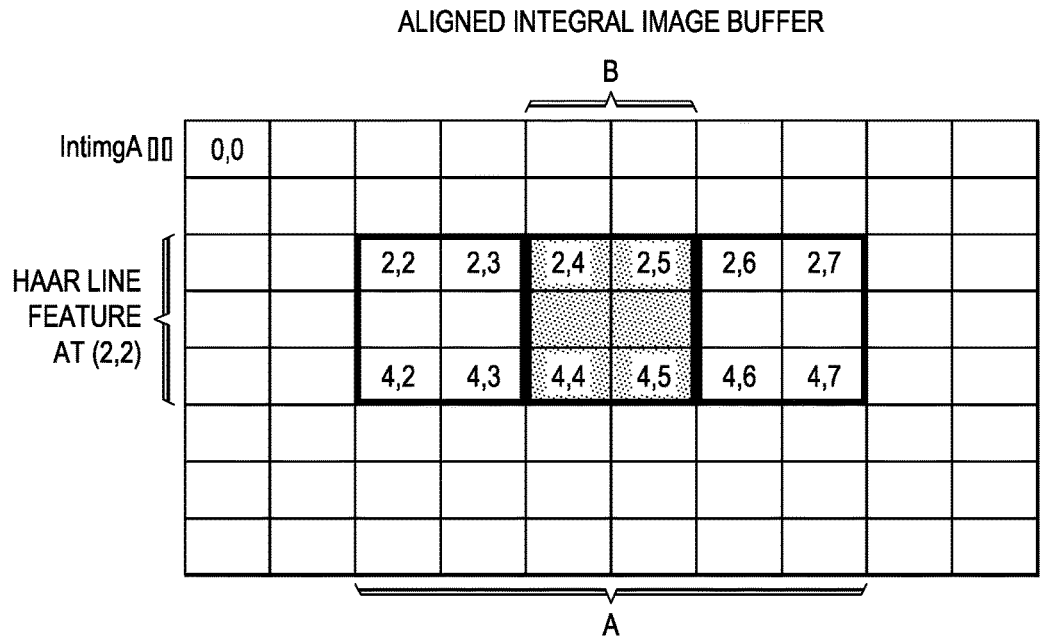
FIGS. 11A-B provide functional diagrams of an exemplary Haar-like line feature calculation using an exemplary aligned integral image buffer and an exemplary non-aligned integral image buffer.
Figure 11B:
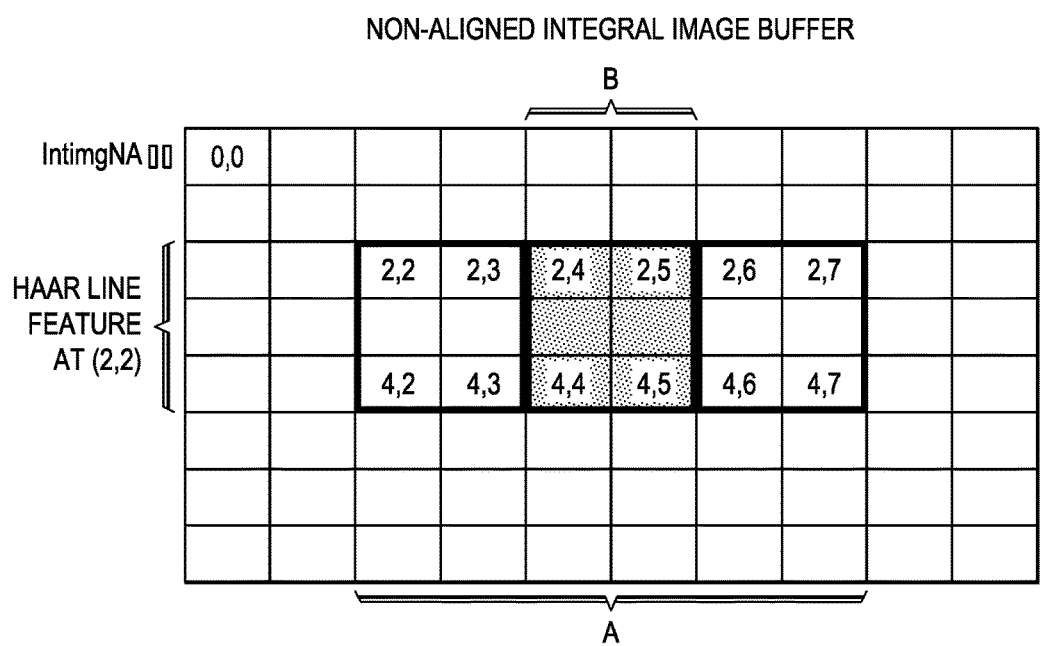

With reference to FIGS. 11A-B, one technique to improve the efficiency of doubleword reads from address locations that are non-aligned for SIMD operations is to copy an aligned (A) integral image buffer (FIG. 11A) to create a non-aligned (NA) integral image buffer (FIG. 11B) in which the data elements of the aligned (A) integral image buffer are shifted one address location to make them aligned. Then, non-aligned address locations can be read from the NA integral image buffer instead of the A integral image buffer.

A modified algorithm for doubleword read operations and Haar-like feature calculations can be implemented using the A integral image buffer (FIG. 11A) for doubleword reads from address locations that are aligned and the NA integral image buffer (FIG. 11B) for doubleword reads from address locations that are non-aligned.

The parallel Haar-like feature calculations for data elements (2,2) and (2,3) can be determined as follows:

FV(2,2)|Next FV(2,3)=(w0|w0)*(((IntimgA(2,2)|IntimgA(2,3))+(IntimgNA(4,7)|IntimgNA(4,8)))−((IntimgNA(2,7)|IntimgNA(2,8))−(IntimgA(4,2)|IntimgA(4,3))))+(w1|w1)*((IntimgA(2,4)|IntimgA(2,5))+(IntimgNA(4,5)|IntimgNA(4,6)))−((IntimgNA(2,5)|IntimgNA(2,6))−(IntimgA(4,4)|IntimgA(4,5))).

Here, a|b represent a vector with two 32-bit data elements associated with a doubleword read operation. The entire rectangular region is processed in the same manner. If the algorithm is implemented for dense Haar-like feature calculations, this same processing is repeated as the rectangular region is shifted through an entire area of interest, which may include the entire integral image or select portions thereof. After each output computation, all pointers jump by two for the next calculation. Thus, the rectangular region is shift two pixels in the horizontal direction instead of pixel-by-pixel by using the doubleword read operation.

Another way of presenting the doubleword reads and the feature value and next feature value computations that make use of the aligned (A) integral image buffer (FIG. 11A) and the non-aligned (NA) integral image buffer (FIG. 11B) is presented below in separate calculations:

FV(2,2)=w0*((IntimgA(2,2)+IntimgNA(4,7))−(IntimgNA(2,7)−IntimgA(4,2)))+w1*((IntimgA(2,4)+IntimgNA(4,5))−(IntimgNA(2,5)−IntimgA(4,4))); and Next FV(2,3)=w0*((IntimgA(2,3)+IntimgNA(4,8))−(IntimgNA(2,8)−IntimgA(4,3))+w1*((IntimgA(2,5))+IntimgNA(4,6))−(IntimgNA(2,6)−IntimgA(4,5)).

The aligned (A) integral image buffer is stored such that the initial data element for the rectangular area of interest is placed at a base address that is aligned for doubleword operations by the processor. Similarly, the non-aligned (NA) integral image buffer is stored such that the initial data element for the rectangular area of interest is placed at base address that is non-aligned for doubleword operations by the processor. Hence, data elements in the aligned (A) integral image buffer at odd locations that are non-aligned for doubleword operations become aligned when read from the non-aligned (NA) integral image buffer. This results in maximum read utilization from processor. Pointers for feature value calculations are decided at the start of core processing loop and remain at the same pitch value during the whole image processing operation. The extra cost of the image processing disclosed herein is the larger memory requirement associated with storing the integral image in multiple storage buffers. However, the buffer requirement does not change once a desired capacity is established even if a processor can handle other than two word read in a single instruction. The buffer requirement will increase by two times if integral image is of 16 bits. Thus, three duplicate copies of integral image will be needed along with original integral image. This method of determining a summation of pixel characteristics for a rectangular region of a digital image can be implemented for dense operation of Haar-like feature computations (i.e., feature values being evaluated at each pixel of a desired area or the entire image).

Figure 12:
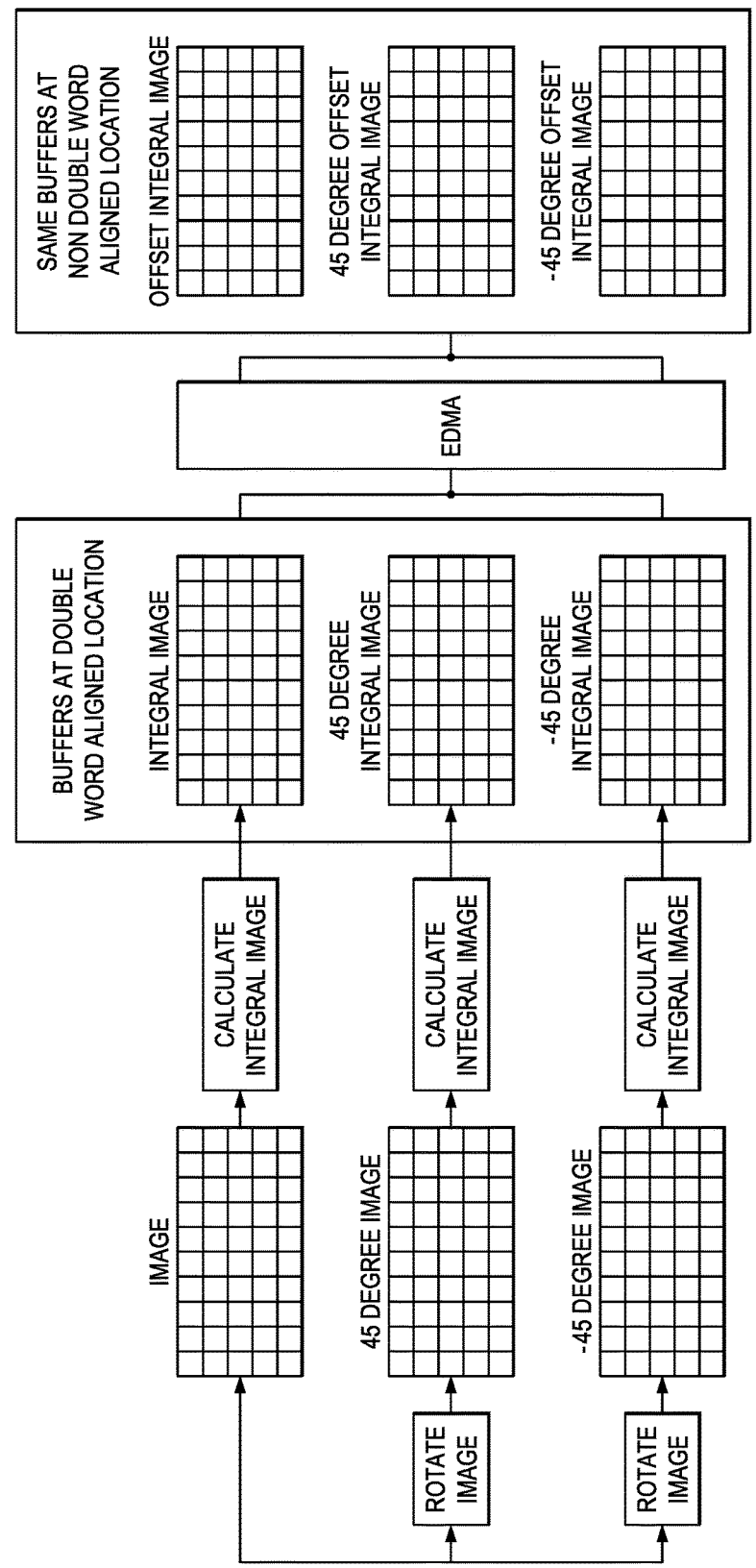
FIG. 12 provides a functional diagram of buffer requirements for an exemplary embodiment of a system for determining a summation of pixel characteristics for a rectangular region of a digital image.

With reference to FIG. 12, a functional diagram shows buffer requirements for an exemplary embodiment of a system for determining a summation of pixel characteristics for a rectangular region of a digital image. Pixels of the original digital image are stored in an upright orientation in a digital image buffer. The pixels of the original digital image are processed using an integral image algorithm to produce an integral image with data elements that correspond to the pixels of the original digital image. Data elements of the integral image are stored in an upright orientation in an integral image buffer. The data elements of the integral image buffer may be stored in address locations for which a reference data element of a rectangular region of interest is aligned for doubleword operations by the processor. The data elements of the integral image buffer are copied using an EDMA process to produce an offset integral image buffer. Data elements of the offset integral image buffer are stored in an upright orientation and shifted (i.e., offset) one address location to the left or right in relation to address locations for the data elements of integral image buffer. The shifting results in the reference data elements in the integral image buffer being stored in an address location that is non-aligned for doubleword operations by the processor. Moreover, the shifting results in data elements in the integral image buffer that are non-aligned for doubleword operations by the processor being aligned for doubleword operations by the processor when they are read from the offset integral image buffer.

The system may also be configured to determine a summation of pixel characteristics for a rectangular region that is rotated in a positive direction in relation to the digital image. For example, the pixels of the original digital image may be processed using a rotation algorithm to produce an original image that is rotated +45 degrees about a central axis. Pixels of the +45 degree digital image are stored in in a +45 degree digital image buffer. The pixels of the +45 degree digital image are processed using the integral image algorithm to produce a +45 degree integral image with data elements that correspond to the pixels of the +45 degree digital image. Data elements of the +45 degree integral image are stored in a +45 degree integral image buffer. The data elements of the +45 degree integral image buffer may be stored in address locations for which a reference data element of a rectangular region of interest that is at a −45 degree orientation in relation to the +45 degree integral image is aligned for doubleword operations by the processor. The data elements of the +45 degree integral image buffer are copied using an EDMA process to produce a +45 degree offset integral image buffer. Data elements of the +45 degree offset integral image buffer are stored and shifted (i.e., offset) one address location to the left or right in relation to address locations for the data elements of +45 degree integral image buffer. The shifting results in the reference data elements in the +45 degree integral image buffer being stored in an address location that is non-aligned for doubleword operations by the processor. The shifting also results in data elements in the +45 degree integral image buffer that are non-aligned for doubleword operations by the processor being aligned for doubleword operations by the processor when they are read from the +45 degree offset integral image buffer.

The system may also be configured to determine a summation of pixel characteristics for a rectangular region that is rotated in a negative direction in relation to the digital image. For example, the pixels of the original digital image may be processed using a rotation algorithm to produce an original image that is rotated −45 degrees about a central axis. Pixels of the −45 degree digital image are stored in in a −45 degree digital image buffer. The pixels of the −45 degree digital image are processed using the integral image algorithm to produce a −45 degree integral image with data elements that correspond to the pixels of the −45 degree digital image. Data elements of the −45 degree integral image are stored in a −45 degree integral image buffer. The data elements of the −45 degree integral image buffer may be stored in address locations for which a reference data element of a rectangular region of interest that is at a +45 degree orientation in relation to the −45 degree integral image is aligned for doubleword operations by the processor. The data elements of the −45 degree integral image buffer are copied using an EDMA process to produce a −45 degree offset integral image buffer. Data elements of the −45 degree offset integral image buffer are stored and shifted (i.e., offset) one address location to the left or right in relation to address locations for the data elements of −45 degree integral image buffer. The shifting results in the reference data elements in the −45 degree integral image buffer being stored in an address location that is non-aligned for doubleword operations by the processor. The shifting also results in data elements in the −45 degree integral image buffer that are non-aligned for doubleword operations by the processor being aligned for doubleword operations by the processor when they are read from the −45 degree offset integral image buffer.

Current methods of dense Haar-like feature calculations only use one integral image. Additionally, current method of dense rotated Haar-like feature calculations use a single captured image and an on-the-fly pixel sum of the area is calculated. Using two integral images where the data elements of one integral image are stored in a buffer at address locations that are aligned for multiple data word read operations by a processor and a second integral image in which the data elements are stored in another buffer at address locations that are non-aligned was not contemplated by current methods. Additionally, creating two rotated image for calculation of rotated Haar-like features as well as their respective integral images at aligned address locations and at non-aligned address locations was not contemplated by current methods. One rotated image for +45 degree clockwise rotation and another rotated image for −45 degree anti-clockwise rotation was not contemplated by current methods.

The various embodiments of a system and method for determining a summation of pixel characteristics for a rectangular region of a digital image eliminate the overhead of non-aligned memory reads from a data buffer (e.g., integral image in Haar-like feature computations) by maintaining aliased/duplicate copies of the data buffer. The various embodiments also reduce on-the-fly rotated image pixel sum calculations by maintaining another integral image which was generated from a rotated image version of an original captured image. The maximum utilization of the read capability of the processor having increased efficiency for non-aligned memory reads. For example, the CPU cycle computation may drop by half.

Figure 13:
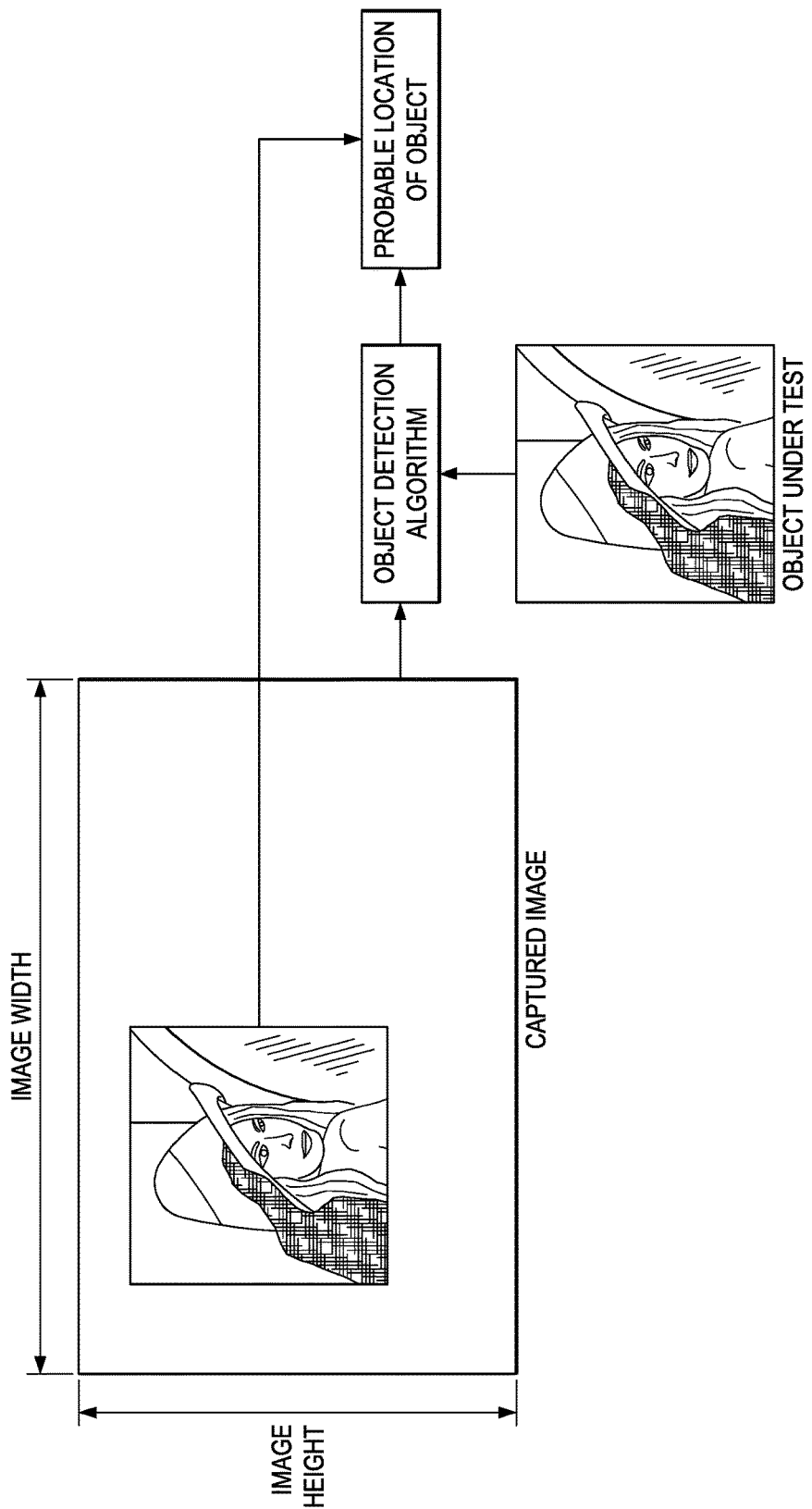
FIG. 13 provides a functional diagram of an exemplary embodiment of an object detection system.

With reference to FIG. 13, a functional diagram provides an exemplary embodiment of an object detection system that can use a process of determining a summation of pixel characteristics for a rectangular region of a digital image to detect a probable location of an object of interest in a captured image.

With reference to FIG. 14, a functional diagram provides an exemplary embodiment of a Haar-like feature-based object detection system that can use a process of determining a summation of pixel characteristics for a rectangular region of a digital image in conjunction with Viola-Jones Haar-like feature calculations to detect characteristics of a face in a captured image.

With reference to FIG. 15, a functional diagram provides an exemplary embodiment of a process of determining a summation of pixel characteristics for a rectangular region of a digital image using a regional area algorithm to determine a feature value for the rectangular region.

Figure 16:
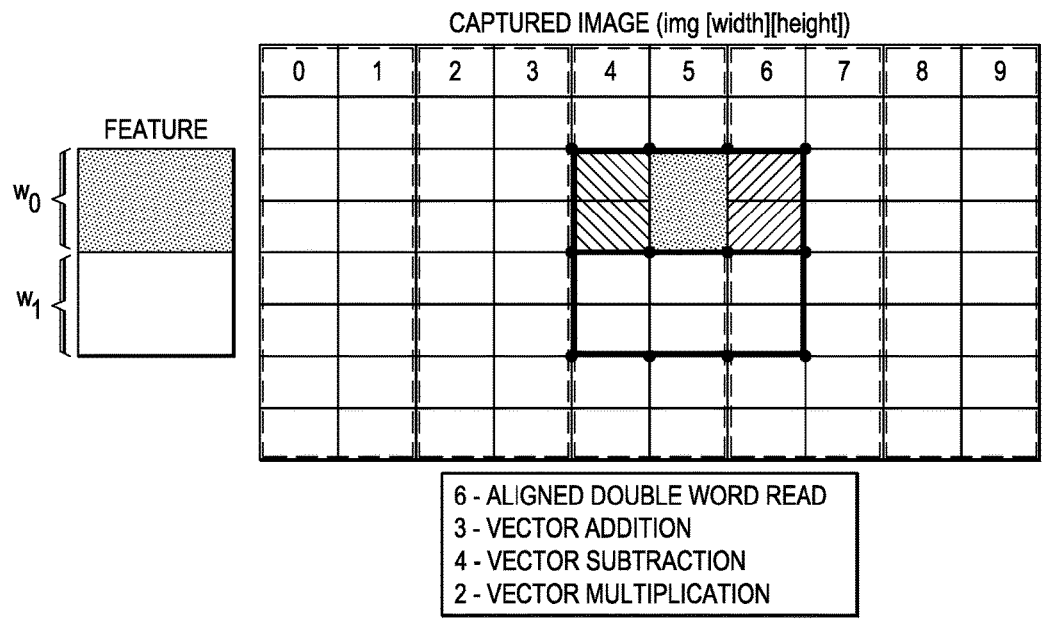
FIG. 16 provides a functional diagram of another exemplary embodiment of a process for determining a summation of pixel characteristics for a rectangular region of a digital image.

With reference to FIG. 16, a functional diagram provides an exemplary embodiment of a process for determining a summation of pixel characteristics for a rectangular region of a digital image using SIMD operations by the processor to perform dense Haar-like edge feature calculations based on data elements stored in an integral image buffer.

Figure 17:
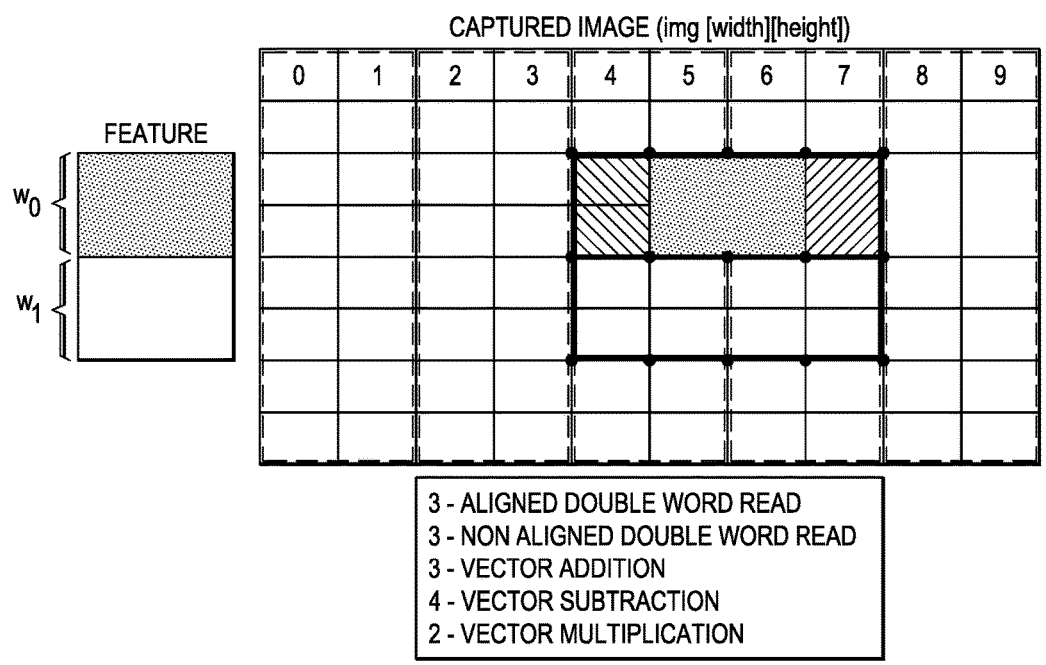
FIG. 17 provides a functional diagram of yet another exemplary embodiment of a process for determining a summation of pixel characteristics for a rectangular region of a digital image.

With reference to FIG. 17, a functional diagram provides another exemplary embodiment of a process for determining a summation of pixel characteristics for a rectangular region of a digital image using SIMD operations by the processor to perform dense Haar-like edge feature calculations based on data elements stored in an integral image buffer.

Figure 18:
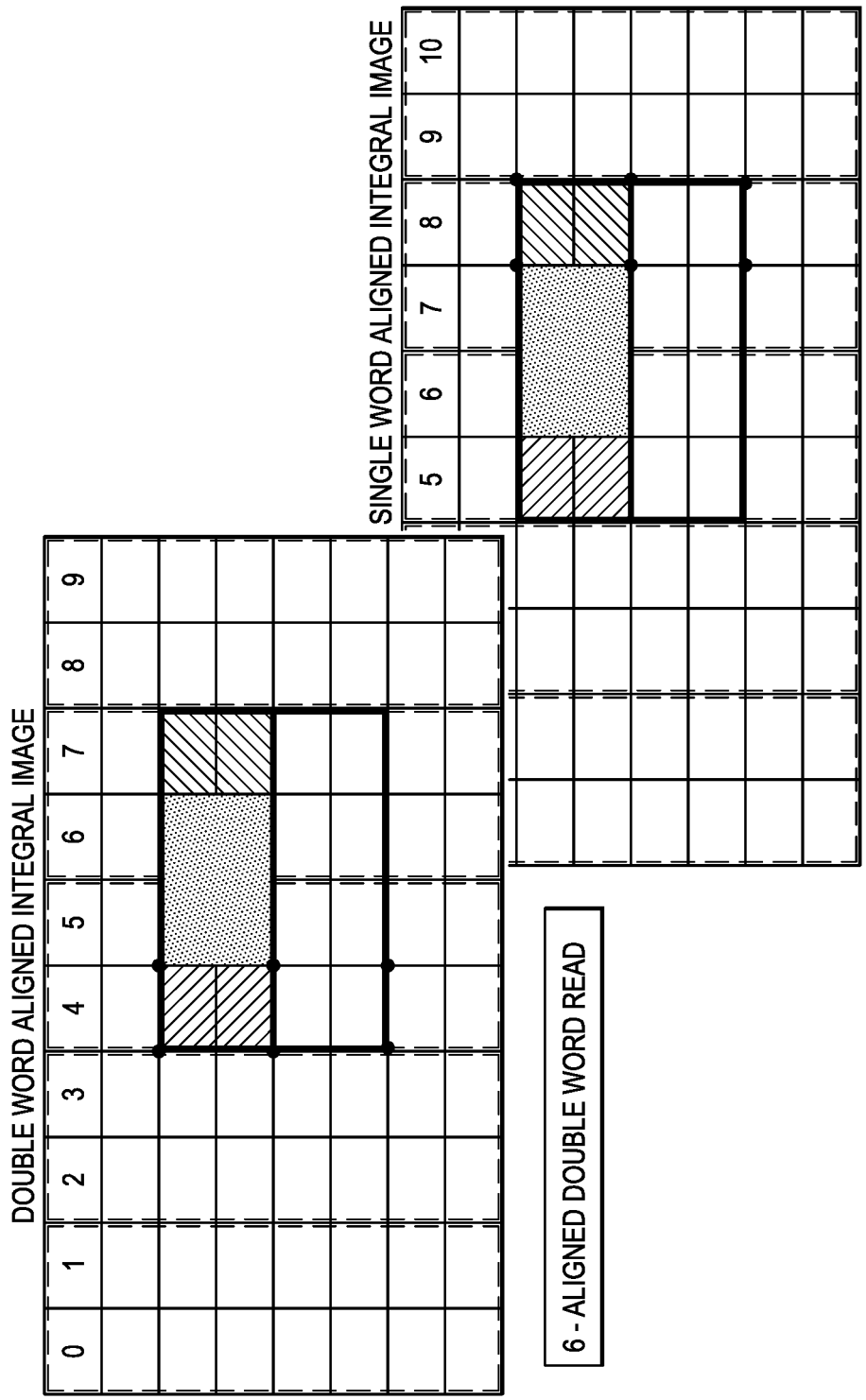
FIG. 18 provides a functional diagram of still another exemplary embodiment of a process for determining a summation of pixel characteristics for a rectangular region of a digital image.

With reference to FIG. 18, a functional diagram provides an exemplary embodiment of a process for determining a summation of pixel characteristics for a rectangular region of a digital image using SIMD operations by the processor to perform dense Haar-like edge feature calculations based on data elements stored in an aligned integral image buffer and a non-aligned integral image buffer.

With reference to FIG. 19, a functional diagram provides an exemplary embodiment of a captured digital image and a corresponding computed integral image. In the exemplary captured digital image, the sum of the pixels in the rectangular regions equals A. In the corresponding computer integral image, the value of the data element corresponding to the lower right corner of the rectangular region equals A.

With reference to FIG. 20, a functional diagram provides another exemplary embodiment of a process of determining a summation of pixel characteristics for a rectangular region of a digital image using a regional area algorithm to determine a feature value for the rectangular region.

Figure 21:
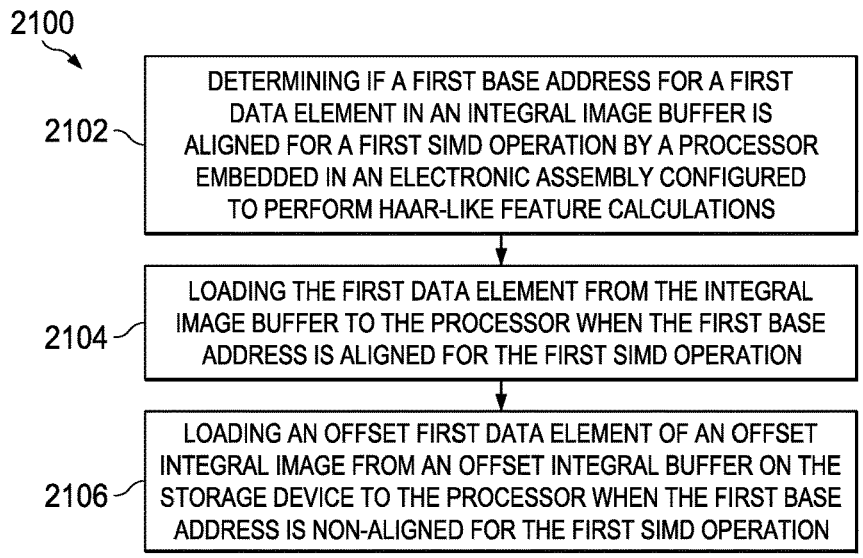
FIG. 21 is a flowchart of an exemplary embodiment of a process for determining a summation of pixel characteristics for a rectangular region of a digital image.

With reference to FIG. 21, an exemplary embodiment of a process 2100 for determining a summation of pixel characteristics for a rectangular region of a digital image begins at 2102 which determines if a first base address for a first data element in an integral image buffer is aligned for an SIMD operation by a processor embedded in an electronic assembly configured to perform Haar-like feature calculations. The first data element represents a first corner of a pre-selected rectangular region of an integral image. The integral image is a representation of a pre-selected digital image. The integral image is formed by data elements stored in the integral image buffer on a storage device accessible to the processor. The first data element is loaded from the integral image buffer to the processor when the first base address is aligned for the first SIMD operation (2104). At 2106, an offset first data element of an offset integral image is loaded from an offset integral buffer on the storage device to the processor when the first base address is non-aligned for the first SIMD operation. The offset first data element represents the first corner of the pre-selected rectangular region. The offset data elements of the offset integral image are defined by the corresponding data elements of the integral image and stored at address locations in the offset integral buffer that are offset right or left by one address location such that a select data element in the integral image buffer at a select address that is non-aligned for a select SIMD operation by the processor is located at a select offset address in the offset integral buffer that is aligned for the select SIMD operation.

Figure 22:
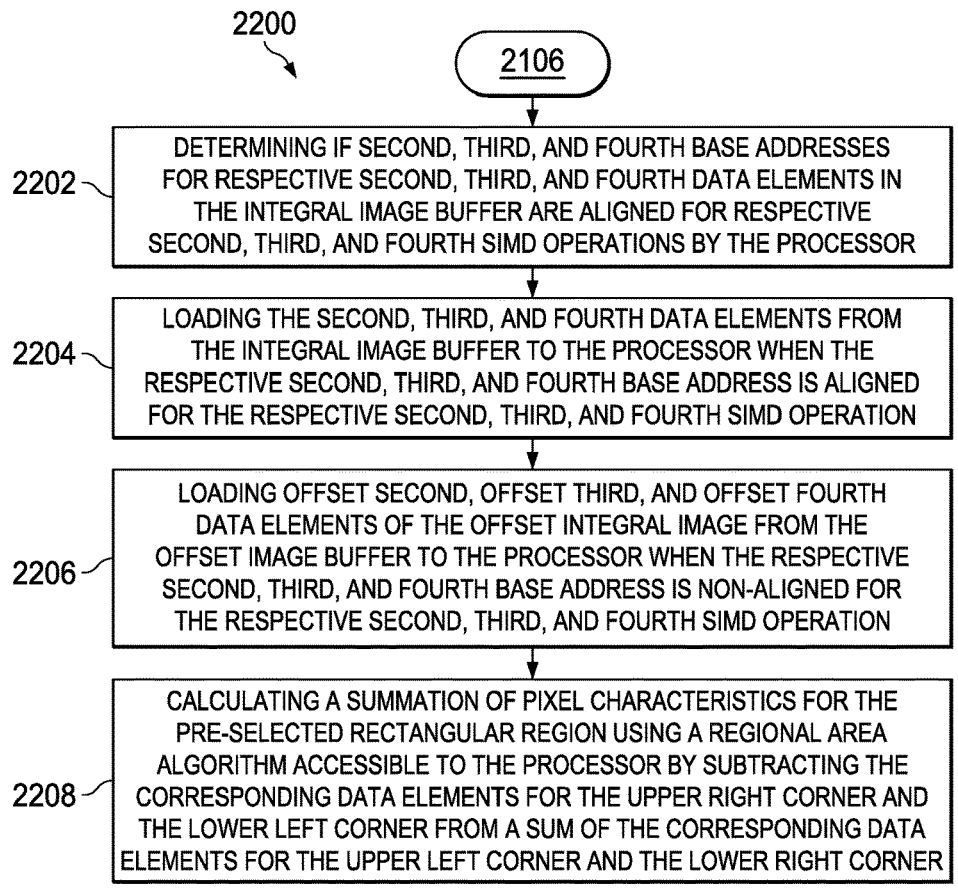
FIG. 22, in combination with FIG. 21, is a flowchart of another exemplary embodiment of a process for determining a summation of pixel characteristics for a rectangular region of a digital image.

With reference to FIGS. 21 and 22, another embodiment of a process 2200 for determining a summation of pixel characteristics for a rectangular region of a digital image includes the process 2100 of FIG. 21 and continues from 2106 to 2202 which determines if second, third, and fourth base addresses for respective second, third, and fourth data elements in the integral image are aligned for respective second, third, and fourth SIMD operations by the processor. The second, third, and fourth data elements respectively represent second, third, and fourth corners of the pre-selected rectangular region. The second, third, and fourth data elements are loaded from the integral image buffer to the processor when the respective second, third, and fourth base address is aligned for the respective second, third, and fourth SIMD operation (2204). At 2206, offset second, offset third, and offset fourth data elements are loaded from the offset integral buffer to the processor when the respective second, third, and fourth base address is non-aligned for the respective second, third, and fourth SIMD operation. The offset second, offset third, and offset fourth data elements respectively represent the second, third, and fourth corners of the pre-selected rectangular region. The first, second, third, and fourth corners represent a set of four corners for the preselected rectangular region. The set of four corners includes an upper left corner, an upper right corner, a lower left corner, and a lower right corner of the preselected rectangular region in any combination. At 2208, a summation of pixel characteristics for the pre-selected rectangular region is calculated using a regional area algorithm accessible to the processor by subtracting the corresponding data elements for the upper right corner and the lower left corner from a sum of the corresponding data elements for the upper left corner and the lower right corner.

Figure 23:
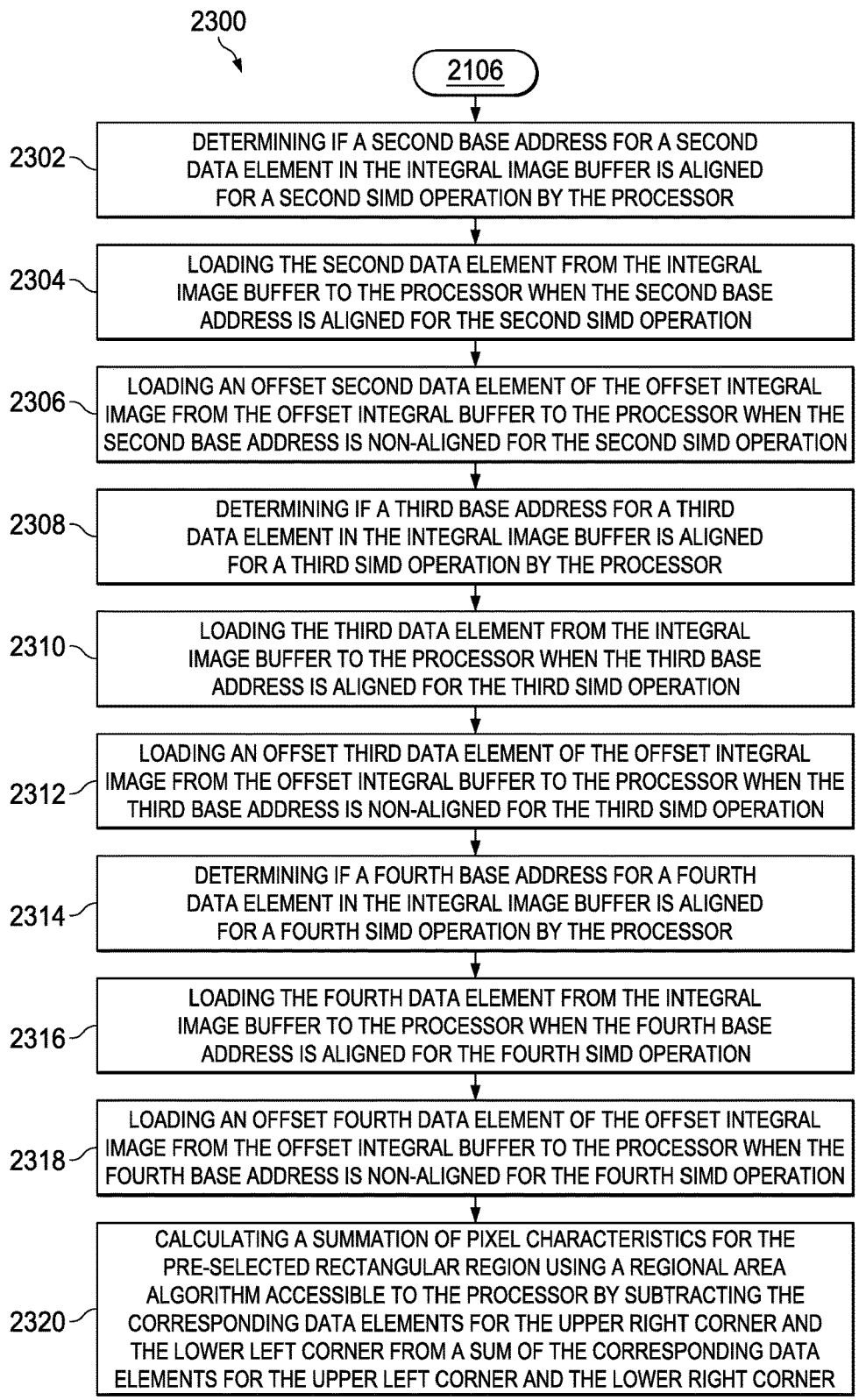
FIG. 23, in combination with FIG. 21, is a flowchart of yet another exemplary embodiment of a process for determining a summation of pixel characteristics for a rectangular region of a digital image.

With reference to FIGS. 21 and 23, another embodiment of a process 2300 for determining a summation of pixel characteristics for a rectangular region of a digital image includes the process 2100 of FIG. 21 and continues from 2106 to 2302 where the process determines if a second base address for a second data element in the integral image buffer is aligned for a second SIMD operation by the processor. The second data element represents a second corner of the pre-selected rectangular region. The second data element is loaded from the integral image buffer to the processor when the second base address is aligned for the second SIMD operation (2304). At 2306, an offset second data element of the offset integral image is loaded from the offset integral buffer to the processor when the second base address is non-aligned for the second SIMD operation. The offset second data element represents the second corner of the pre-selected rectangular region. At 2308, the process determines if a third base address for a third data element is aligned for a third SIMD operation by the processor. The third data element represents a third corner of the pre-selected rectangular region. The third data element is loaded from the integral image buffer to the processor when the third base address is aligned for the third SIMD operation (2310). At 2312, an offset third data element of the offset integral image is loaded from the offset integral buffer to the processor when the third base address is non-aligned for the third SIMD operation. The offset third data element represents the third corner of the pre-selected rectangular region. At 2314, the process determines if a fourth base address for a fourth data element in the integral image buffer is aligned for a fourth SIMD operation by the processor. The fourth data element represents a fourth corner of the pre-selected rectangular region. The fourth data element is loaded from the integral image buffer to the processor when the fourth base address is aligned for the fourth SIMD operation (2316). At 2318, an offset fourth data element of the offset integral image is loaded from the offset integral buffer to the processor when the fourth base address is non-aligned for the fourth SIMD operation. The offset fourth data element represents the fourth corner of the pre-selected rectangular region.

The first, second, third, and fourth corners represent a set of four corners for the preselected rectangular region. The set of four corners includes an upper left corner, an upper right corner, a lower left corner, and a lower right corner of the preselected rectangular region in any combination. At 2320, a summation of pixel characteristics for the pre-selected rectangular region is calculated using a regional area algorithm accessible to the processor by subtracting the corresponding data elements for the upper right corner and the lower left corner from a sum of the corresponding data elements for the upper left corner and the lower right corner.

With reference again to FIG. 21, another embodiment of the process 2100 also includes processing the pre-selected digital image using a summation algorithm to form the integral image. The pre-selected digital image is formed by pixels stored in a digital image buffer. Each pixel is defined by pixel characteristics. Each data element of the integral image represents a corresponding pixel in the pre-selected digital image. In this embodiment, the process also includes selecting a target rectangular region of the integral image for which summation of pixel characteristics is desired in conjunction with performing Haar-like feature calculations. The target rectangular region defines the pre-selected rectangular region.

In a further embodiment of the process 2100, the summation algorithm sums pixel characteristics of the pre-selected digital image such that each data element of the integral image corresponds to a sum of pixel characteristics for pixels above and left of the corresponding data element for an upright orientation of the pre-selected digital image. In this embodiment, orientation of the target rectangular region follows the upright orientation of the pre-selected digital image.

In another further embodiment of the process 2100, the summation algorithm sums pixel characteristics of the pre-selected digital image such that each data element of the integral image corresponds to a sum of pixel characteristics for pixels above and left of the corresponding data element for a −45 degree orientation in relation to an upright orientation of the pre-selected digital image. In this embodiment, orientation of the target rectangular region is +45 degrees in relation to orientation of the pre-selected digital image.

In yet another further embodiment of the process 2100, the summation algorithm sums pixel characteristics of the pre-selected digital image such that each data element of the integral image corresponds to a sum of pixel characteristics for pixels above and left of the corresponding data element for a +45 degree orientation in relation to an upright orientation of the pre-selected digital image. In this embodiment, orientation of the target rectangular region is −45 degrees in relation to orientation of the pre-selected digital image.

In yet another embodiment, the process 2100 also includes processing the pre-selected digital image using a rotation algorithm to form a clockwise digital image. The pre-selected digital image is formed by pixels stored in a digital image buffer reflecting an upright orientation, wherein the clockwise digital image presents the pixels of the pre-selected digital image in a clockwise image buffer reflecting a −45 degree orientation. Each pixel is defined by pixel characteristics. Each data element of the integral image represents a corresponding pixel in the clockwise digital image. The clockwise digital image is processed using a summation algorithm to form the integral image in the −45 degree orientation. The summation algorithm sums pixel characteristics of the pre-selected digital image such that each data element of the integral image corresponds to a sum of pixel characteristics for pixels above and left of the corresponding data element. A target rectangular region of the integral image is selected for which summation of pixel characteristics is desired in conjunction with performing Haar-like feature calculations. The target rectangular region defines the pre-selected rectangular region. Orientation of the target rectangular region is +45 degrees in relation to orientation of the clockwise digital image.

In still another embodiment, the process 2100 also includes processing the pre-selected digital image using a rotation algorithm to form a counterclockwise digital image. The pre-selected digital image is formed by pixels stored in a digital image buffer reflecting an upright orientation. The counterclockwise digital image presents the pixels of the pre-selected digital image in a counterclockwise image buffer reflecting a +45 degree orientation. Each pixel is defined by pixel characteristics. Each data element of the integral image represents a corresponding pixel in the counterclockwise digital image. The counterclockwise digital image is processed using a summation algorithm to form the integral image in the +45 degree orientation. The summation algorithm sums pixel characteristics of the pre-selected digital image such that each data element of the integral image corresponds to a sum of pixel characteristics for pixels above and left of the corresponding data element. A target rectangular region of the integral image is selected for which summation of pixel characteristics is desired in conjunction with performing Haar-like feature calculations. The target rectangular region defines the pre-selected rectangular region. Orientation of the target rectangular region is −45 degrees in relation to orientation of the counterclockwise digital image.

In still yet another embodiment, the process 2100 also includes generating the offset integral image in the offset integral buffer by copying the integral image from the integral image buffer such that addresses for the data elements of the offset integral image in the offset integral buffer are incremented or decremented by one address location in relation to the addresses for the corresponding data elements of the integral image in the integral image buffer.

In another embodiment of the process 2100, the first SIMD operation is a doubleword operation involving two consecutive data words associated with the first base address and a "plus one" address adjacent to the first base address. The "plus one" address is for a next data element in the integral image buffer that represents a first corner of a next rectangular region for a next Haar-like feature calculation. The next data element is loaded from the integral image buffer to the processor along with the first data element when the first base address is aligned for the first SIMD operation. The next data element is loaded from the offset integral buffer to the processor along with the first data element when the first base address is non-aligned for the first SIMD operation.

In yet another embodiment of the process 2100, the first SIMD operation is a quadword operation involving four consecutive data words associated with the first base address, a "plus one" address adjacent to the first base address, a "plus two" address adjacent to the "plus one" address, and a "plus three" address adjacent to the "plus two" address. The "plus one" address is for a next data element in the integral image buffer that represents a first corner of a next rectangular region for a next Haar-like feature calculation. The "plus two" address is for a further data element in the integral image buffer that represents a first corner of a further rectangular region for a further Haar-like feature calculation. The "plus three" address is for an even further data element in the integral image buffer that represents a first corner of an even further rectangular region for an even further Haar-like feature calculation. The next, further, and even further data elements are loaded from the integral image buffer to the processor along with the first data element when the first base address is aligned for the first SIMD operation. The next, further, and even further data elements are loaded from the offset integral buffer to the processor along with the first data element when the first base address is non-aligned for the first SIMD operation.

Figure 24:
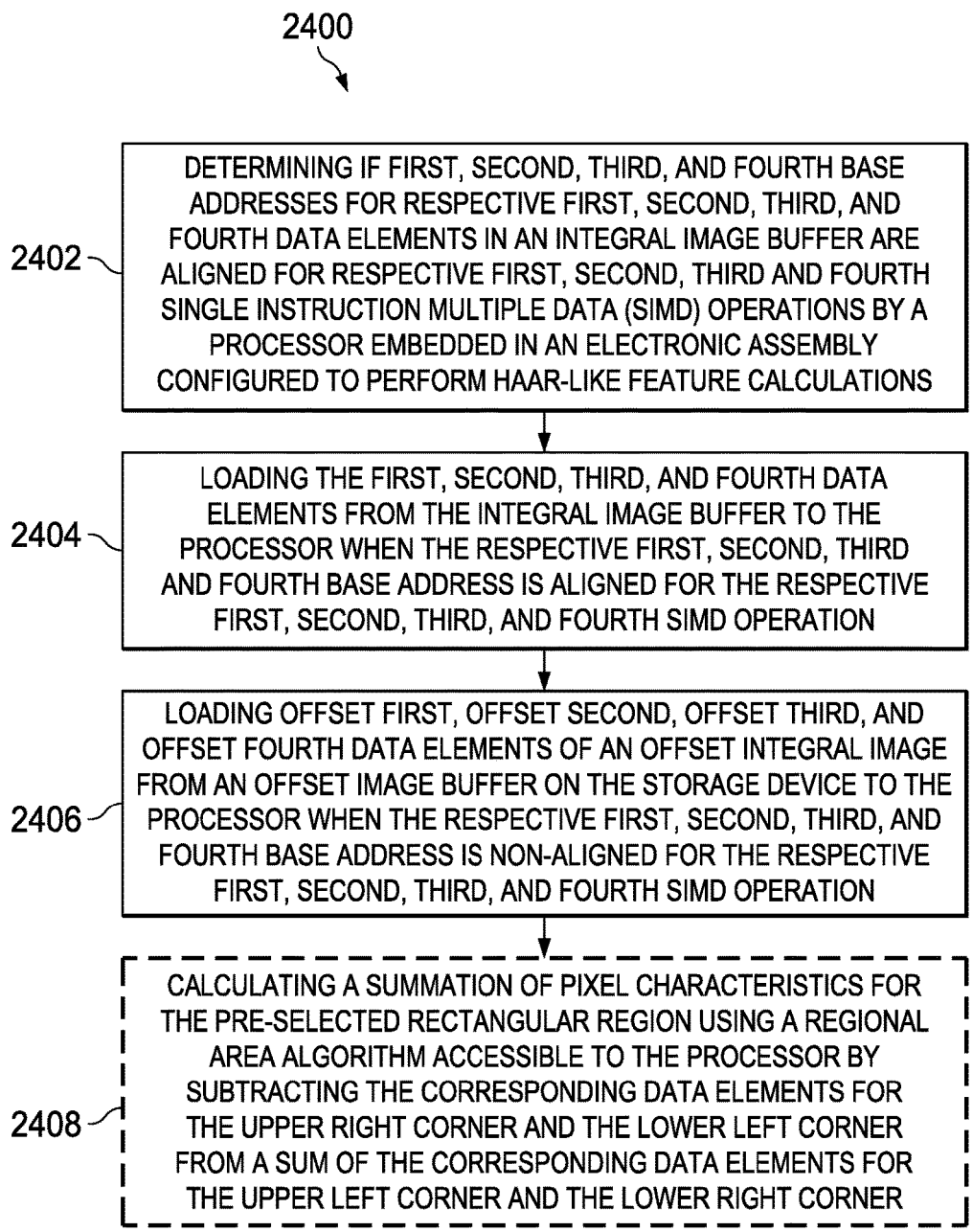
FIG. 24 is a flowchart of still another exemplary embodiment of a process for determining a summation of pixel characteristics for a rectangular region of a digital image.

With reference to FIG. 24, an exemplary embodiment of a process 2400 for determining a summation of pixel characteristics for a rectangular region of a digital image begins at 2402 which determines if first, second, third, and fourth base addresses for respective first, second, third, and fourth data elements in an integral image buffer are aligned for respective first, second, third, and fourth SIMD operations by a processor embedded in an electronic assembly configured to perform Haar-like feature calculations. The first, second, third, and fourth data elements respectively represent upper left, upper right, lower left, and lower right corners of a pre-selected rectangular region of an integral image. The integral image is a representation of a pre-selected digital image. The integral image is formed by data elements stored in the integral image buffer on a storage device accessible to the processor. First, second, third, and fourth data elements of the integral image are loaded from the integral image buffer to the processor when the respective first, second, third, and fourth base address is aligned for the respective first, second, third, and fourth SIMD operation (2404). At 2406, offset first, offset second, offset third, and offset fourth data elements of an offset integral image are loaded from an offset integral buffer on the storage device to the processor when the respective first, second, third, and fourth base address is non-aligned for the respective first, second, third, and fourth SIMD operation. The offset first, offset second, offset third, and offset fourth data elements respectively represent the upper left, upper right, lower left, and lower right corners of the pre-selected rectangular region. The offset data elements of the offset integral image are defined by the corresponding data elements of the integral image and stored at address locations in the offset integral buffer that are offset right or left by one address location such that a select data element in the integral image buffer at a select address that is non-aligned for a select SIMD operation by the processor is located at a select offset address in the offset integral buffer that is aligned for the select SIMD operation.

In another embodiment, the process 2400 also includes calculating a summation of pixel characteristics for the pre-selected rectangular region using a regional area algorithm accessible to the processor by subtracting the corresponding data elements for the upper right corner and the lower left corner from a sum of the corresponding data elements for the upper left corner and the lower right corner (2406).

In yet another embodiment, the process 2400 also includes processing the pre-selected digital image using a summation algorithm to form the integral image. The pre-selected digital image is formed by pixels stored in a digital image buffer. Each pixel is defined by pixel characteristics. Each data element of the integral image represents a corresponding pixel in the pre-selected digital image. A target rectangular region of the integral image is selected for which summation of pixel characteristics is desired in conjunction with performing Haar-like feature calculations. The target rectangular region defines the pre-selected rectangular region.

In a further embodiment of the process 2400, the summation algorithm sums pixel characteristics of the pre-selected digital image such that each data element of the integral image corresponds to a sum of pixel characteristics for pixels above and left of the corresponding data element for an upright orientation of the pre-selected digital image. In this embodiment, orientation of the target rectangular region follows the upright orientation of the pre-selected digital image.

In another further embodiment of the process 2400, the summation algorithm sums pixel characteristics of the pre-selected digital image such that each data element of the integral image corresponds to a sum of pixel characteristics for pixels above and left of the corresponding data element for a −45 degree orientation in relation to an upright orientation of the pre-selected digital image. In this embodiment, orientation of the target rectangular region is +45 degrees in relation to orientation of the pre-selected digital image.

In yet another further embodiment of the process 2400, the summation algorithm sums pixel characteristics of the pre-selected digital image such that each data element of the integral image corresponds to a sum of pixel characteristics for pixels above and left of the corresponding data element for a +45 degree orientation in relation to an upright orientation of the pre-selected digital image. In this embodiment, orientation of the target rectangular region is −45 degrees in relation to orientation of the pre-selected digital image.

In still another embodiment, the process 2400 also includes processing the pre-selected digital image using a rotation algorithm to form a clockwise digital image. The pre-selected digital image is formed by pixels stored in a digital image buffer reflecting an upright orientation. The clockwise digital image presents the pixels of the pre-selected digital image in a clockwise image buffer reflecting a −45 degree orientation. Each pixel is defined by pixel characteristics. Each data element of the integral image represents a corresponding pixel in the clockwise digital image. The clockwise digital image is processed using a summation algorithm to form the integral image in the −45 degree orientation. The summation algorithm sums pixel characteristics of the pre-selected digital image such that each data element of the integral image corresponds to a sum of pixel characteristics for pixels above and left of the corresponding data element. A target rectangular region of the integral image is selected for which summation of pixel characteristics is desired in conjunction with performing Haar-like feature calculations. The target rectangular region defines the pre-selected rectangular region. Orientation of the target rectangular region is +45 degrees in relation to orientation of the clockwise digital image.

In still yet another embodiment, the process 2400 also includes processing the pre-selected digital image using a rotation algorithm to form a counterclockwise digital image. The pre-selected digital image is formed by pixels stored in a digital image buffer reflecting an upright orientation. The counterclockwise digital image presents the pixels of the pre-selected digital image in a counterclockwise image buffer reflecting a +45 degree orientation. Each pixel is defined by pixel characteristics. Each data element of the integral image represents a corresponding pixel in the counterclockwise digital image. The counterclockwise digital image is processed using a summation algorithm to form the integral image in the +45 degree orientation. The summation algorithm sums pixel characteristics of the pre-selected digital image such that each data element of the integral image corresponds to a sum of pixel characteristics for pixels above and left of the corresponding data element. A target rectangular region of the integral image is selected for which summation of pixel characteristics is desired in conjunction with performing Haar-like feature calculations. The target rectangular region defines the pre-selected rectangular region. Orientation of the target rectangular region is −45 degrees in relation to orientation of the counterclockwise digital image.

In another embodiment, the process 2400 also includes generating the offset integral image in the offset integral buffer by copying the integral image from the integral image buffer such that addresses for the data elements of the offset integral image in the offset integral buffer are incremented or decremented by one address location in relation to the addresses for the corresponding data elements of the integral image in the integral image buffer.

In yet another embodiment of the process 2400, the first SIMD operation is a doubleword operation involving two consecutive data words associated with the first base address and a first "plus one" address adjacent to the first base address. The first "plus one" address is for a first next data element in the integral image buffer that represents an upper left corner of a next rectangular region for a next Haar-like feature calculation. The first next data element is loaded from the integral image buffer to the processor along with the first data element when the first base address is aligned for the first SIMD operation. The first next data element is loaded from the offset integral buffer to the processor along with the first data element when the first base address is non-aligned for the first SIMD operation. The second SIMD operation is a doubleword operation involving two consecutive data words associated with the second base address and a second "plus one" address adjacent to the second base address. The second "plus one" address is for a second next data element in the integral image buffer that represents an upper right corner of the next rectangular region for the next Haar-like feature calculation. The second next data element is loaded from the integral image buffer to the processor along with the second data element when the second base address is aligned for the second SIMD operation. The second next data element is loaded from the offset integral buffer to the processor along with the second data element when the second base address is non-aligned for the second SIMD operation. The third SIMD operation is a doubleword operation involving two consecutive data words associated with the third base address and a third "plus one" address adjacent to the third base address. The third "plus one" address is for a third next data element in the integral image buffer that represents a lower left corner of the next rectangular region for the next Haar-like feature calculation. The third next data element is loaded from the integral image buffer to the processor along with the third data element when the third base address is aligned for the third SIMD operation. The third next data element is loaded from the offset integral buffer to the processor along with the third data element when the third base address is non-aligned for the third SIMD operation. The fourth SIMD operation is a doubleword operation involving two consecutive data words associated with the fourth base address and a fourth "plus one" address adjacent to the fourth base address. The fourth "plus one" address is for a fourth next data element in the integral image buffer that represents a lower right corner of the next rectangular region for the next Haar-like feature calculation. The fourth next data element is loaded from the integral image buffer to the processor along with the fourth data element when the fourth base address is aligned for the fourth SIMD operation. The fourth next data element is loaded from the offset integral buffer to the processor along with the fourth data element when the fourth base address is non-aligned for the fourth SIMD operation.

In still another embodiment of the process 2400, the first, second, third, and fourth SIMD operations are quadword operations involving four consecutive data words for each SIMD operation and associated with the respective first, second, third, and fourth base address, a corresponding "plus one" address adjacent to each base address, a corresponding "plus two" address adjacent to each "plus one" address, and a corresponding "plus three" address adjacent to each "plus two" address. Each "plus one" address is for a corresponding next data element in the integral image buffer that represents a corresponding upper left, upper right, lower left, or lower right corner of a next rectangular region for a next Haar-like feature calculation. Each "plus two" address is for a corresponding further data element in the integral image buffer that represents a corresponding upper left, upper right, lower left, or lower right corner of a further rectangular region for a further Haar-like feature calculation. Each "plus three" address is for a corresponding even further data element in the integral image buffer that represents a corresponding upper left, upper right, lower left, or lower right corner of an even further rectangular region for an even further Haar-like feature calculation. The corresponding next, further, and even further data elements are loaded from the integral image buffer to the processor along with the respective first, second, third, and fourth data element when the respective first, second, third, and fourth base address is aligned for the respective first, second, third, and fourth SIMD operation. The corresponding next, further, and even further data elements are loaded from the integral image buffer to the processor along with the respective first, second, third, and fourth data element when the respective first, second, third, and fourth base address is non-aligned for the respective first, second, third, and fourth SIMD operation.

Figure 25:
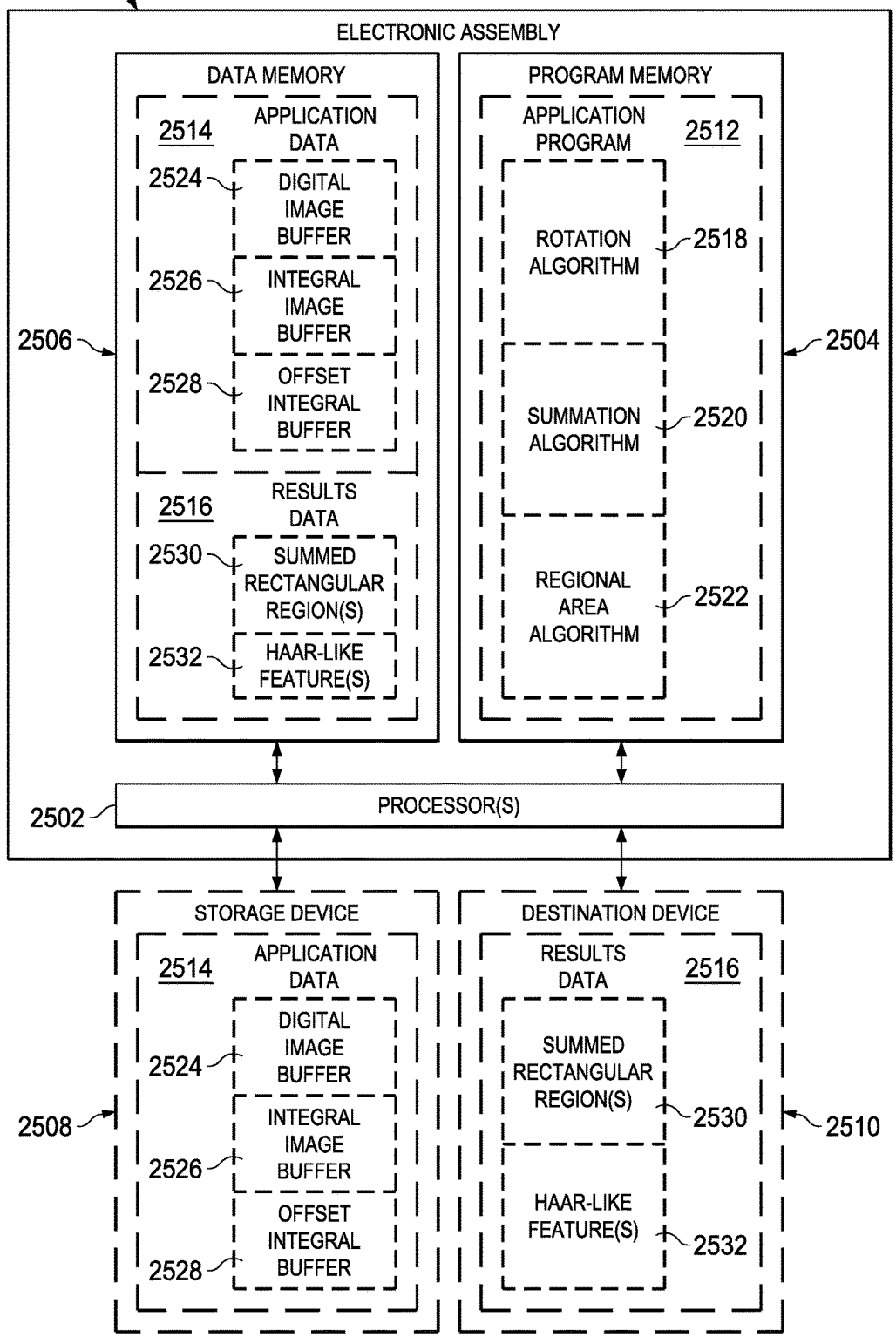
FIG. 25 is a block diagram of an exemplary embodiment of an electronic assembly for determining a summation of pixel characteristics for a rectangular region of a digital image.

With reference to FIG. 25, an exemplary embodiment of an electronic assembly 2500 for determining a summation of pixel characteristics for a rectangular region of a digital image in conjunction with performing Haar-like feature calculation includes at least one processor 2502, program memory 2504, and data memory 2506. The at least one processor 2502 is in operative communication with an external storage device 2508 and an external destination device 2510. The program memory 2504 may include an application program 2512 with program instructions that, when executed by the at least one processor 2502, cause the electronic assembly 2500 to perform a method of determining the summation of pixel characteristics for the rectangular region of the digital image. In other embodiments, the application program 2512 may be stored on any suitable external storage device. Application data 2514 associated with the application program 2512 may be stored in the data memory 2506 and/or the external storage device 2508 in any suitable combination. Results data 2516 associated with the application program 2512 may be stored in the data memory 2506 and/or the external destination device 2510 in any suitable combination.

The application program 2512 may include a rotation algorithm 2518, a summation algorithm 2520, a regional area algorithm 2522, and other algorithms associated with determining the summation of pixel characteristics for the rectangular region in any suitable combination. The application data 2514 may include a digital image buffer 2524, an integral image buffer 2526, an offset integral buffer 2528, and other buffers associated with determining the summation of pixel characteristics for the rectangular region in any suitable combination. The results data 2516 may include one or more summed rectangular regions 2530, one or more Haar-like features 2532, and other results associated with determining the summation of pixel characteristics for the rectangular region and/or Haar-like feature calculations in any suitable combination.

In one embodiment of the electronic assembly 2500, the at least one processor 2502 is configured to determine if first, second, third, and fourth base addresses for respective first, second, third, and fourth data elements in an integral image buffer are aligned for respective first, second, third, and fourth SIMD operations by the at least one processor 2502. The first second, third, and fourth data elements respectively represent upper left, upper right, lower left, and lower right corners of a pre-selected rectangular region of an integral image. The integral image is a representation of a pre-selected digital image. The integral image is formed by data elements stored in the integral image buffer 2526 in the data memory 2506 on the external storage device 2508 or any suitable storage device accessible to the at least one processor 2502. The at least one processor 2502 is configured to load first, second, third, and fourth data elements from the integral image buffer 2526 when the respective first, second, third, and fourth base address is aligned for the respective first, second, third, and fourth SIMD operation. The at least one processor 2502 is configured to load offset first, offset second, offset third, and offset fourth data elements of an offset integral image from the offset integral buffer 2528 in the data memory 2506 on the external storage device 2508 or any suitable storage device when the respective first, second, third, and fourth base address is non-aligned for the respective first, second, third, and fourth SIMD operation. The offset first, offset second, offset third, and offset fourth data elements respectively represent the upper left, upper right, lower left, and lower right corners of the pre-selected rectangular region. The offset data elements of the offset integral image are defined by the corresponding data elements of the integral image and stored at address locations in the offset integral buffer 2528 that are offset right or left by one address location such that a select data element in the integral image buffer 2526 at a select address that is non-aligned for a select SIMD operation by the at least one processor 2502 is located at a select offset address in the offset integral buffer 2528 that is aligned for the select SIMD operation.

In another embodiment of the electronic assembly 2500, the at least one processor 2502 is configured to calculate a summation of pixel characteristics for the pre-selected rectangular region using the regional area algorithm 2522 by subtracting the corresponding data elements for the upper right corner and the lower left corner from a sum of the corresponding data elements for the upper left corner and the lower right corner.

In yet another embodiment of the electronic assembly 2500, the at least one processor 2502 is configured to process the pre-selected digital image using the summation algorithm 2520 to form the integral image. The pre-selected digital image is formed by pixels stored in the digital image buffer 2524. Each pixel is defined by pixel characteristics. Each data element of the integral image represents a corresponding pixel in the pre-selected digital image. The at least one processor 2502 is configured to select a target rectangular region of the integral image for which summation of pixel characteristics is desired in conjunction with performing Haar-like feature calculations. The target rectangular region defines the pre-selected rectangular region.

In a further embodiment of the electronic assembly 2500, the summation algorithm 2520 sums pixel characteristics of the pre-selected digital image such that each data element of the integral image corresponds to a sum of pixel characteristics for pixels above and left of the corresponding data element for an upright orientation of the pre-selected digital image. Orientation of the target rectangular region follows the upright orientation of the pre-selected digital image.

In another further embodiment of the electronic assembly 2500, the summation algorithm 2520 sums pixel characteristics of the pre-selected digital image such each data element of the integral image corresponds to a sum of pixel characteristics for pixels above and left of the corresponding data element for a −45 degree orientation in relation to an upright orientation of the pre-selected digital image. Orientation of the target rectangular region is +45 degrees in relation to orientation of the pre-selected digital image.

In yet another embodiment of the electronic assembly 2500, the summation algorithm 2520 sums pixel characteristics of the pre-selected digital image such each data element of the integral image corresponds to a sum of pixel characteristics for pixels above and left of the corresponding data element for a +45 degree orientation in relation to an upright orientation of the pre-selected digital image. Orientation of the target rectangular region is −45 degrees in relation to orientation of the pre-selected digital image.

In still another embodiment of the electronic assembly 2500, the at least one processor 2502 is configured to process the pre-selected digital image using the rotation algorithm 2518 to form a clockwise digital image. The pre-selected digital image is formed by pixels stored in the digital image buffer 2524 reflecting an upright orientation. The clockwise digital image presents the pixels of the pre-selected digital image in a clockwise image buffer reflecting a −45 degree orientation. Except for the different orientation, the digital image in the clockwise image buffer is the same as the digital image in the digital image buffer 2524. Each pixel is defined by pixel characteristics. Each element of the integral image represents a corresponding pixel in the clockwise digital image. The at least one processor 2502 is configured to process the clockwise digital image using the summation algorithm 2520 to form the integral image in the −45 degree orientation. The summation algorithm 2520 sums pixel characteristics of the pre-selected digital image such that each data element of the integral image corresponds to a sum of pixel characteristics for pixels above and left of the corresponding data element. The at least one processor 2502 is configured to select a target rectangular region of the integral image for which summation of pixel characteristics is desired in conjunction with performing Haar-like feature calculations. The target rectangular region defines the pre-selected rectangular region. Orientation of the target rectangular region is +45 degrees in relation to orientation of the clockwise digital image.

In still yet another embodiment of the electronic assembly 2500, the at least one processor 2502 is configured to process the pre-selected digital image using the rotation algorithm 2518 to form a counterclockwise digital image. The pre-selected digital image is formed by pixels stored in the digital image buffer 2524 reflecting an upright orientation. The counterclockwise digital image presents the pixels of the pre-selected digital image in a counterclockwise image buffer reflecting a +45 degree orientation. Except for the different orientation, the digital image in the counterclockwise image buffer is the same as the digital image in the digital image buffer 2524. Each pixel is defined by pixel characteristics. Each data element of the integral image represents a corresponding pixel in the counterclockwise digital image. The at least one processor 2502 is configured to process the counterclockwise digital image using the summation algorithm 2520 to form the integral image in the +45 degree orientation. The summation algorithm 2520 sums pixel characteristics of the pre-selected digital image such that each data element of the integral image corresponds to a sum of pixel characteristics for pixels above and left of the corresponding data element. The at least one processor 2502 is configured to select a target rectangular region of the integral image for which summation of pixel characteristics is desired in conjunction with performing Haar-like feature calculations. The target rectangular region defines the pre-selected rectangular region. Orientation of the target rectangular region is −45 degrees in relation to orientation of the counterclockwise digital image.

In still yet another embodiment of the electronic assembly 2500, the at least one processor 2502 is configured to generate the offset integral image in the offset integral buffer 2528 by copying the integral image from the integral image buffer 2526 such that addresses for the data elements of the offset integral image in the offset integral buffer 2528 are incremented or decremented by one address location in relation to the addresses for the corresponding data elements of the integral image in the integral image buffer 2526.

In yet another embodiment of the electronic assembly 2400, the first SIMD operation is a doubleword operation involving two consecutive data words associated with the first base address and a first "plus one" address adjacent to the first base address. The first "plus one" address is for a first next data element in the integral image buffer 2526 that represents an upper left corner of a next rectangular region for a next Haar-like feature calculation. The first next data element is loaded from the integral image buffer 2526 to the at least one processor 2502 along with the first data element when the first base address is aligned for the first SIMD operation. The first next data element is loaded from the offset integral buffer 2528 to the at least one processor 2502 along with the first data element when the first base address is non-aligned for the first SIMD operation. The second SIMD operation is a doubleword operation involving two consecutive data words associated with the second base address and a second "plus one" address adjacent to the second base address. The second "plus one" address is for a second next data element in the integral image buffer 2526 that represents an upper right corner of the next rectangular region for the next Haar-like feature calculation. The second next data element is loaded from the integral image buffer 2526 to the at least one processor 2502 along with the second data element when the second base address is aligned for the second SIMD operation. The second next data element is loaded from the offset integral buffer 2528 to the at least one processor 2502 along with the second data element when the second base address is non-aligned for the second SIMD operation. The third SIMD operation is a doubleword operation involving two consecutive data words associated with the third base address and a third "plus one" address adjacent to the third base address. The third "plus one" address is for a third next data element in the integral image buffer 2526 that represents a lower left corner of the next rectangular region for the next Haar-like feature calculation. The third next data element is loaded from the integral image buffer 2526 to the at least one processor 2502 along with the third data element when the third base address is aligned for the third SIMD operation. The third next data element is loaded from the offset integral buffer 2528 to the at least one processor 2502 along with the third data element when the third base address is non-aligned for the third SIMD operation. The fourth SIMD operation is a doubleword operation involving two consecutive data words associated with the fourth base address and a fourth "plus one" address adjacent to the fourth base address. The fourth "plus one" address is for a fourth next data element in the integral image buffer 2526 that represents a lower right corner of the next rectangular region for the next Haar-like feature calculation. The fourth next data element is loaded from the integral image buffer 2526 to the at least one processor 2502 along with the fourth data element when the fourth base address is aligned for the fourth SIMD operation. The fourth next data element is loaded from the offset integral buffer 2528 to the at least one processor 2502 along with the fourth data element when the fourth base address is non-aligned for the fourth SIMD operation.

In still another embodiment of the electronic assembly 2500, the first, second, third, and fourth SIMD operations are quadword operations involving four consecutive data words for each SIMD operation and associated with the respective first, second, third, and fourth base address, a corresponding "plus one" address adjacent to each base address, a corresponding "plus two" address adjacent to each "plus one" address, and a corresponding "plus three" address adjacent to each "plus two" address. Each "plus one" address is for a corresponding next data element in the integral image buffer 2526 that represents a corresponding upper left, upper right, lower left, or lower right corner of a next rectangular region for a next Haar-like feature calculation. Each "plus two" address is for a corresponding further data element in the integral image buffer 2526 that represents a corresponding upper left, upper right, lower left, or lower right corner of a further rectangular region for a further Haar-like feature calculation. Each "plus three" address is for a corresponding even further data element in the integral image buffer 2526 that represents a corresponding upper left, upper right, lower left, or lower right corner of an even further rectangular region for an even further Haar-like feature calculation. The corresponding next, further, and even further data elements are loaded from the integral image buffer 2526 to the at least one processor 2502 along with the respective first, second, third, and fourth data element when the respective first, second, third, and fourth base address is aligned for the respective first, second, third, and fourth SIMD operation. The corresponding next, further, and even further data elements are loaded from the integral image buffer 2526 to the at least one processor 2502 along with the respective first, second, third, and fourth data element when the respective first, second, third, and fourth base address is non-aligned for the respective first, second, third, and fourth SIMD operation.

Various exemplary embodiments of non-transitory computer-readable medium storing program instructions that, when executed by a processor embedded in a processor-controlled electronic assembly configured to perform Haar-like feature calculations, cause the processor-controlled electronic assembly to perform a method of determining a summation of pixel characteristics for a rectangular region of a digital image. For example, various embodiments of the electronic assembly 2500 are described above with reference to FIG. 25. Various embodiments of the method of determining a summation of pixel characteristics for a rectangular region of a digital image 2100, 2200, 2300, 2400, for example, are described above with reference to FIGS. 21-24.

The various embodiments of non-transitory computer-readable medium store program instructions that, when executed by a processor, may cause a corresponding processor-controlled electronic assembly to perform various combinations of functions associated with the various embodiments of the processes 2100, 2200, 2300, 2400 for determining a summation of pixel characteristics for a rectangular region of a digital image described above with reference to FIGS. 21-24. For example, the various embodiments of the electronic assembly 2500 described above with reference to FIG. 25 may include the processor 2502 and may perform the various combination of functions associated with determining a summation of pixel characteristics for a rectangular region of a digital image based on the program instructions stored on corresponding embodiments of the non-transitory computer readable medium.

The program instructions of the various exemplary embodiments of non-transitory computer-readable medium are defined by any suitable combination of the processes 2100, 2200, 2300, 2400 described above with reference to FIGS. 21-24. Similarly, the processor 2502 and the electronic assembly 2500 associated with the various exemplary embodiments of non-transitory computer-readable medium are defined by any suitable combination of the electronic assembly 2500 described above with reference to FIG. 25.

The above examples are merely illustrative of several possible embodiments of various aspects of the present disclosure, wherein equivalent alterations and/or modifications will occur to others skilled in the art upon reading and understanding this specification and the associated drawings. For example, the rectangular sum is one example for illustrating the use of multiple buffers to solve the problem of non-aligned addresses read. However, the same technique can be extended and used with any dense image based operation, such as convolution. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. An electronic assembly, comprising:
   at least one processor; and
   a non-transitory computer readable storage medium storing a program for execution by the at least one processor, the program including instructions to:
      load a first data element from an integral image buffer, to the at least one processor, in response to determining that a first base address is aligned for a first single instruction multiple data (SIMD) operation by the at least one processor; and
      load an offset first data element of an offset integral image from an offset integral buffer on a storage device, to the at least one processor, in response to determining that the first base address is non-aligned for the first SIMD operation;
   wherein the offset first data element represents a first corner of a rectangular region of a digital image, wherein the first data element represents the first corner of the rectangular region of an integral image, wherein the integral image is a representation of the digital image, and wherein the integral image is formed by data elements stored in the integral image buffer on the storage device; and
   wherein the offset first data element of the offset integral image is defined by corresponding data elements of the integral image and stored at address locations in the offset integral buffer that are offset by one address location such that a select data element in the integral image buffer at a select address that is non-aligned for a select SIMD operation by the at least one processor is located at a select offset address in the offset integral buffer that is aligned for the select SIMD operation.

2. The electronic assembly of claim 1, wherein the instructions further comprise instructions to:
   determine whether second, third, and fourth base addresses for respective second, third, and fourth data elements in the integral image buffer are aligned for respective second, third, and fourth SIMD operations by the at least one processor, wherein the second, third, and fourth data elements respectively represent second, third, and fourth corners of the rectangular region;
   load the second, third, and fourth data elements from the integral image buffer, to the at least one processor, in response to determining that the respective second, third, and fourth base addresses are aligned for the respective second, third, and fourth SIMD operation;

load offset second, offset third, and offset fourth data elements of the offset integral image from the offset integral buffer to the at least one processor, in response to determining that the respective second, third, and fourth base addresses are non-aligned for the respective second, third, and fourth SIMD operation, wherein the offset second, offset third, and offset fourth data elements respectively represent the second, third, and fourth corners of the rectangular region, wherein the first, second, third, and fourth corners represent a set of four corners for the rectangular region, and wherein the set of four corners includes an upper left corner, an upper right corner, a lower left corner, and a lower right corner of the rectangular region in any combination; and calculate a summation of pixel characteristics for the rectangular region using a regional area algorithm accessible to the at least one processor by subtracting corresponding data elements for the upper right corner and the lower left corner from a sum of the corresponding data elements for the upper left corner and the lower right corner.

3. The electronic assembly of claim 1, wherein the instructions further comprise instructions to:

determine whether a second base address for a second data element in the integral image buffer is aligned for a second SIMD operation by the at least one processor, wherein the second data element represents a second corner of the rectangular region;

load the second data element from the integral image buffer to the at least one processor, in response to determining that the second base address is aligned for the second SIMD operation;

load an offset second data element of the offset integral image from the offset integral buffer to the at least one processor in response to determining that the second base address is non-aligned for the second SIMD operation, wherein the offset second data element represents the second corner of the rectangular region;

determine whether a third base address for a third data element in the integral image buffer is aligned for a third SIMD operation by the at least one processor, wherein the third data element represents a third corner of the rectangular region;

load the third data element from the integral image buffer to the at least one processor in response to determining that the third base address is aligned for the third SIMD operation;

load an offset third data element of the offset integral image from the offset integral buffer to the at least one processor in response to determining that the third base address is non-aligned for the third SIMD operation, wherein the offset third data element represents the third corner of the rectangular region;

determine whether a fourth base address for a fourth data element in the integral image buffer is aligned for a fourth SIMD operation by the at least one processor, wherein the fourth data element represents a fourth corner of the rectangular region;

load the fourth data element from the integral image buffer to the at least one processor in response to determining that the fourth base address is aligned for the fourth SIMD operation;

load an offset fourth data element of the offset integral image from the offset integral buffer to the at least one processor in response to determining that the fourth base address is non-aligned for the fourth SIMD operation, wherein the offset fourth data element represents the fourth corner of the rectangular region, wherein the first, second, third, and fourth corners represent a set of four corners for the rectangular region, wherein the set of four corners includes an upper left corner, an upper right corner, a lower left corner, and a lower right corner of the rectangular region in any combination; and calculate a summation of pixel characteristics for the rectangular region using a regional area algorithm accessible to the at least one processor by subtracting corresponding data elements for the upper right corner and the lower left corner from a sum of corresponding data elements for the upper left corner and the lower right corner.

4. The electronic assembly of claim 1, wherein the instructions further comprise instructions to:

process the digital image using a summation algorithm to form the integral image, wherein the digital image is formed by pixels stored in a digital image buffer, wherein each pixel is defined by pixel characteristics, wherein each data element of the integral image represents a corresponding pixel in the digital image; and select a target rectangular region of the integral image for which summation of pixel characteristics is desired in conjunction with performing Haar-like feature calculations, wherein the target rectangular region defines the rectangular region.

5. The electronic assembly of claim 4, wherein the summation algorithm sums pixel characteristics of the digital image such that each data element of the integral image corresponds to a sum of pixel characteristics for pixels above and left of corresponding data elements for an upright orientation of the digital image, wherein orientation of the target rectangular region follows the upright orientation of the digital image.

6. The electronic assembly of claim 4, wherein the summation algorithm sums pixel characteristics of the digital image such that each data element of the integral image corresponds to a sum of pixel characteristics for pixels above and left of a corresponding data element for a −45 degree orientation in relation to an upright orientation of the digital image, wherein orientation of the target rectangular region is +45 degrees in relation to orientation of the digital image.

7. The electronic assembly of claim 4, wherein the summation algorithm sums pixel characteristics of the digital image such that each data element of the integral image corresponds to a sum of pixel characteristics for pixels above and left of a corresponding data element for a +45 degree orientation in relation to an upright orientation of the digital image, wherein orientation of the target rectangular region is −45 degrees in relation to orientation of the digital image.

8. The electronic assembly of claim 1, wherein the instructions further comprise instructions to:

process the digital image using a rotation algorithm to form a clockwise digital image, wherein the digital image is formed by pixels stored in a digital image buffer reflecting an upright orientation, wherein the clockwise digital image presents pixels of the digital image in a clockwise image buffer reflecting a −45 degree orientation, wherein each pixel is defined by pixel characteristics, wherein each data element of the integral image represents a corresponding pixel in the clockwise digital image;

process the clockwise digital image using a summation algorithm to form the integral image in the −45 degree orientation, wherein the summation algorithm sums pixel characteristics of the digital image such that each data element of the integral image corresponds to a sum of pixel characteristics for pixels above and left of a corresponding data element; and select a target rectangular region of the integral image for which summation of pixel characteristics is desired in conjunction with performing Haar-like feature calculations, wherein the target rectangular region defines the rectangular region, wherein orientation of the target rectangular region is +45 degrees in relation to orientation of the clockwise digital image.

9. The electronic assembly of claim 1, wherein the instructions further comprise instructions to:

process the digital image using a rotation algorithm to form a counterclockwise digital image, wherein the digital image is formed by pixels stored in a digital image buffer reflecting an upright orientation, wherein the counterclockwise digital image presents pixels of the digital image in a counterclockwise image buffer reflecting a +45 degree orientation, wherein each pixel is defined by pixel characteristics, wherein each data element of the integral image represents a corresponding pixel in the counterclockwise digital image;

process the counterclockwise digital image using a summation algorithm to form the integral image in the +45 degree orientation, wherein the summation algorithm sums pixel characteristics of the digital image such each data element of the integral image corresponds to a sum of pixel characteristics for pixels above and left of a corresponding data element; and select a target rectangular region of the integral image for which summation of pixel characteristics is desired in conjunction with performing Haar-like feature calculations, wherein the target rectangular region defines the rectangular region, wherein orientation of the target rectangular region is −45 degrees in relation to orientation of the counterclockwise digital image.

10. The electronic assembly of claim 1, wherein the instructions further comprise instructions to:

generate the offset integral image in the offset integral buffer by copying the integral image from the integral image buffer such that addresses for the data elements of the offset integral image in the offset integral buffer are incremented or decremented by one address location in relation to the addresses for corresponding data elements of the integral image in the integral image buffer.

11. The electronic assembly of claim 1, wherein the first SIMD operation is a doubleword operation involving two consecutive data words associated with the first base address and a plus one address adjacent to the first base address;

wherein the plus one address is for a next data element in the integral image buffer that represents a first corner of a next rectangular region for a next Haar-like feature calculation;

wherein the next data element is loaded from the integral image buffer to the at least one processor along with the first data element when the first base address is aligned for the first SIMD operation; and wherein the next data element is loaded from the offset integral buffer to the at least one processor along with the first data element when the first base address is non-aligned for the first SIMD operation.

12. The electronic assembly of claim 1, wherein the first SIMD operation is a quadword operation involving four consecutive data words associated with the first base address, a plus one address adjacent to the first base address, a plus two address adjacent to the plus one address, and a plus three address adjacent to the plus two address;

wherein the plus one address is for a next data element in the integral image buffer that represents a first corner of a next rectangular region for a next Haar-like feature calculation;

wherein the plus two address is for a further data element in the integral image buffer that represents a first corner of a further rectangular region for a further Haar-like feature calculation;

wherein the plus three address is for an even further data element in the integral image buffer that represents a first corner of an even further rectangular region for an even further Haar-like feature calculation;

wherein the next, further, and even further data elements are loaded from the integral image buffer to the at least one processor along with the first data element when the first base address is aligned for the first SIMD operation; and wherein the next, further, and even further data elements are loaded from the offset integral buffer to the at least one processor along with the first data element when the first base address is non-aligned for the first SIMD operation.

13. An electronic assembly, comprising:

at least one processor; and a non-transitory computer readable storage medium storing a program for execution by the at least one processor, the program including instructions to:

load a first data element, a second data element, a third data element, and a fourth data element from an integral image buffer to the at least one processor, in response to determining that a first base address of the first data element in the integral image buffer is aligned for a first single instruction multiple data (SIMD) operation for the at least one processor, a second base address of the second data element in the integral image buffer is aligned for a second SIMD operation for the at least one processor, a third base address of the third data element in the integral image buffer is aligned for a third SIMD operation for the at least one processor, and a fourth base address of the fourth data element in the integral image buffer is aligned for a fourth SIMD operation for the at least one processor; and load an offset first data element, an offset second data element, an offset third data element, and an offset fourth data element of an offset integral image from an offset integral buffer on a storage device to the at least one processor, in response to determining that the first base address of the first data element in the integral image buffer is non-aligned for the first SIMD operation for the at least one processor, the second base address of the second data element in the integral image buffer is non-aligned for the second SIMD operation for the at least one processor, the third base address of the third data element in the integral image buffer is non-aligned for the third SIMD operation for the at least one processor, and the fourth base address of the fourth data element in the integral image buffer is non-aligned for the fourth SIMD operation for the at least one processor;

wherein the offset first data element represents an upper left corner of a rectangular region, the offset second data element represents an upper right corner of a rectangular region of an integral image, the offset third data element represents a lower left corner of the rectangular region of the integral image, and the offset fourth data element represents a lower right corner of the rectangular region, wherein the integral image is a representation of a digital image, wherein the integral image is formed by data elements stored in the integral image buffer on the storage device accessible to the at least one processor; and wherein the offset data elements of the offset integral image are defined by corresponding data elements of the integral image and stored at address locations in the offset integral buffer that are offset right or left by one address location such that a select data element in the integral image buffer at a select address that is non-aligned for a select SIMD operation by the at least one processor is located at a select offset address in the offset integral buffer that is aligned for the select SIMD operation.

14. The electronic assembly of claim 13, wherein the instructions further comprise instructions to:

calculate a summation of pixel characteristics for the rectangular region using a regional area algorithm accessible to the at least one processor by subtracting corresponding data elements for the upper right corner and the lower left corner from a sum of corresponding data elements for the upper left corner and the lower right corner.

15. The electronic assembly of claim 13, wherein the instructions further comprise instructions to:

process the digital image using a summation algorithm to form the integral image, wherein the digital image is formed by pixels stored in a digital image buffer, wherein each pixel is defined by pixel characteristics, wherein each data element of the integral image represents a corresponding pixel in the digital image; and select a target rectangular region of the integral image for which summation of pixel characteristics is desired in conjunction with performing Haar-like feature calculations, wherein the target rectangular region defines the rectangular region.

16. The electronic assembly of claim 15, wherein the summation algorithm sums pixel characteristics of the digital image such that each data element of the integral image corresponds to a sum of pixel characteristics for pixels above and left of a corresponding data element for an upright orientation of the digital image, wherein orientation of the target rectangular region follows the upright orientation of the digital image.

17. The electronic assembly of claim 15, wherein the summation algorithm sums pixel characteristics of the digital image such that each data element of the integral image corresponds to a sum of pixel characteristics for pixels above and left of a corresponding data element for a −45 degree orientation in relation to an upright orientation of the digital image, wherein orientation of the target rectangular region is +45 degrees in relation to orientation of the digital image.

18. The electronic assembly of claim 15, wherein the summation algorithm sums pixel characteristics of the digital image such that each data element of the integral image corresponds to a sum of pixel characteristics for pixels above and left of a corresponding data element for a +45 degree orientation in relation to an upright orientation of the digital image, wherein orientation of the target rectangular region is −45 degrees in relation to orientation of the digital image.

19. The electronic assembly of claim 13, wherein the instructions further comprise instructions to:

process the digital image using a rotation algorithm to form a clockwise digital image, wherein the digital image is formed by pixels stored in a digital image buffer reflecting an upright orientation, wherein the clockwise digital image presents pixels of the digital image in a clockwise image buffer reflecting a −45 degree orientation, wherein each pixel is defined by pixel characteristics, wherein each data element of the integral image represents a corresponding pixel in the clockwise digital image;

process the clockwise digital image using a summation algorithm to form the integral image in the −45 degree orientation, wherein the summation algorithm sums pixel characteristics of the digital image such that each data element of the integral image corresponds to a sum of pixel characteristics for pixels above and left of a corresponding data element; and select a target rectangular region of the integral image for which summation of pixel characteristics is desired in conjunction with performing Haar-like feature calculations, wherein the target rectangular region defines the rectangular region, wherein orientation of the target rectangular region is +45 degrees in relation to orientation of the clockwise digital image.

20. The electronic assembly of claim 13, wherein the instructions further comprise instructions to:

process the digital image using a rotation algorithm to form a counterclockwise digital image, wherein the digital image is formed by pixels stored in a digital image buffer reflecting an upright orientation, wherein the counterclockwise digital image presents pixels of the digital image in a counterclockwise image buffer reflecting a +45 degree orientation, wherein each pixel is defined by pixel characteristics, wherein each data element of the integral image represents a corresponding pixel in the counterclockwise digital image;

process the counterclockwise digital image using a summation algorithm to form the integral image in the +45 degree orientation, wherein the summation algorithm sums pixel characteristics of the digital image such that each data element of the integral image corresponds to a sum of pixel characteristics for pixels above and left of the corresponding data element; and select a target rectangular region of the integral image for which summation of pixel characteristics is desired in conjunction with performing Haar-like feature calculations, wherein the target rectangular region defines the rectangular region, wherein orientation of the target rectangular region is −45 degrees in relation to orientation of the counterclockwise digital image.

* * * * *